US012488670B2

United States Patent
Reddy et al.

(10) Patent No.: US 12,488,670 B2
(45) Date of Patent: Dec. 2, 2025

(54) ELECTRONIC SHELF LABEL (ESL) POSITION BASED NOTIFICATIONS

(71) Applicant: QUALCOMM Incorporated, San Diego, CA (US)

(72) Inventors: Varun Amar Reddy, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 139 days.

(21) Appl. No.: 18/467,417

(22) Filed: Sep. 14, 2023

(65) Prior Publication Data

US 2025/0095472 A1    Mar. 20, 2025

(51) Int. Cl.
*G08B 25/00*        (2006.01)
*G08B 21/18*        (2006.01)

(52) U.S. Cl.
CPC .................................. *G08B 21/18* (2013.01)

(58) Field of Classification Search
USPC ............. 340/686.1, 691.1, 691.6, 3.43, 3.44, 340/825.23, 5.91, 5.92, 825.36, 7.55, 340/825.49
See application file for complete search history.

(56) References Cited

U.S. PATENT DOCUMENTS

2004/0057407 A1* 3/2004 Balachandran ... H04W 72/0446 370/336
2013/0179142 A1* 7/2013 Kim ........................ G06F 30/33 703/14
2017/0286901 A1* 10/2017 Skaff ..................... G06V 10/751
2021/0026586 A1* 1/2021 Hu .......................... G06K 17/00
2021/0349470 A1* 11/2021 McDaniel ............ G05D 1/0276
2022/0051310 A1* 2/2022 Graube .............. G06Q 30/0633

FOREIGN PATENT DOCUMENTS

EP    3836516 A1    6/2021

OTHER PUBLICATIONS

International Search Report and Written Opinion—PCT/US2024/045157—ISA/EPO—Nov. 29, 2024.

* cited by examiner

*Primary Examiner* — Daniel Previl
(74) *Attorney, Agent, or Firm* — Norton Rose Fulbright US LLP

(57) ABSTRACT

This disclosure provides systems, methods, and devices for wireless communication that support enhanced ESL position determination and ESL position based notifications. In a first aspect, a method of wireless communication includes obtaining first position information for an asset of one or more assets associated with an electronic shelf label system based on first wireless information, and the first position information is associated with a first time. The method also includes obtaining second position information for the asset based on second wireless information, and the second position information is associated with a second time. The method further includes determining a notification for the asset based on the first position information, the second position information, the first time, and the second time. Other aspects and features are also claimed and described.

30 Claims, 15 Drawing Sheets

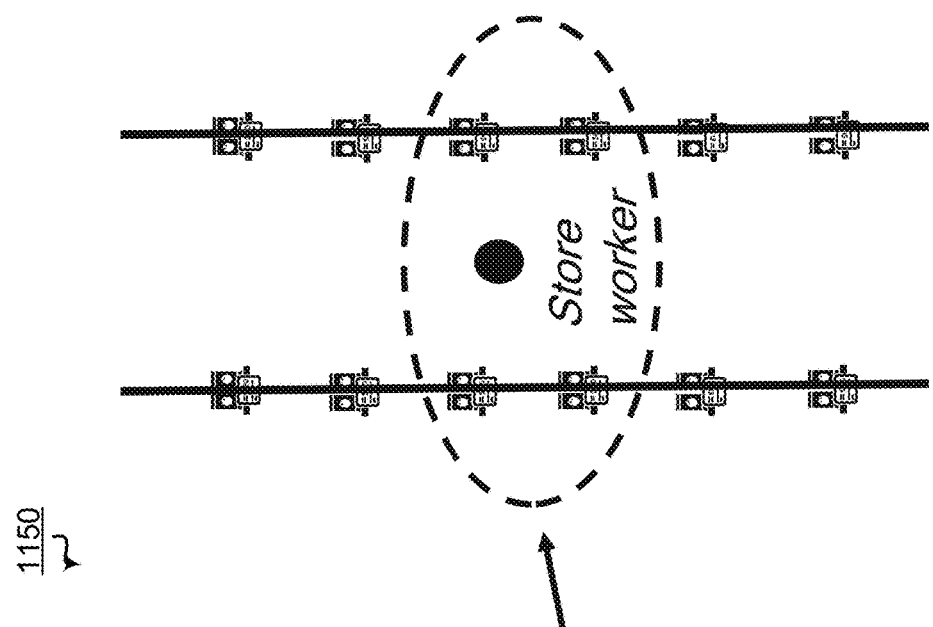
FIG. 11B
$$\hat{P} = \frac{\sum_{k=1}^{N} w_k \cdot P_k}{\sum_{k=1}^{N} w_k}$$
FIG. 11C
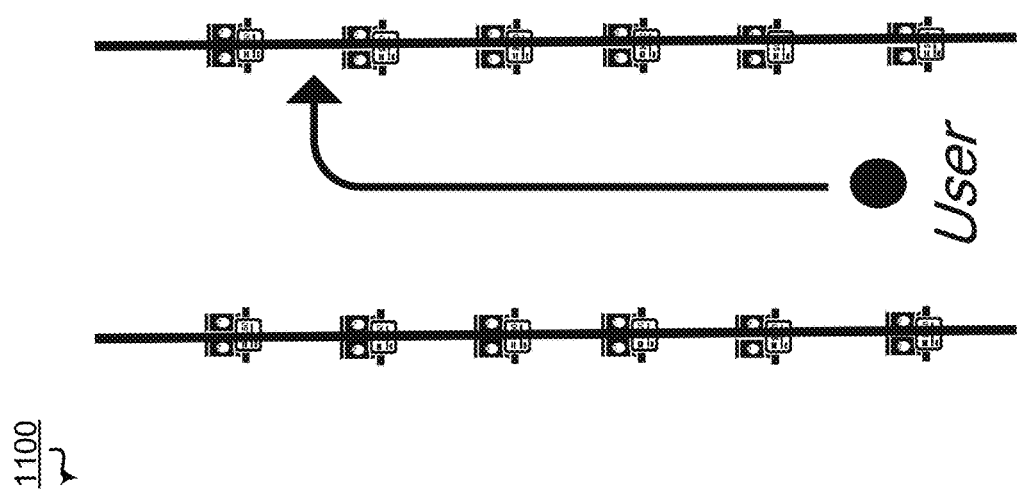
FIG. 11A

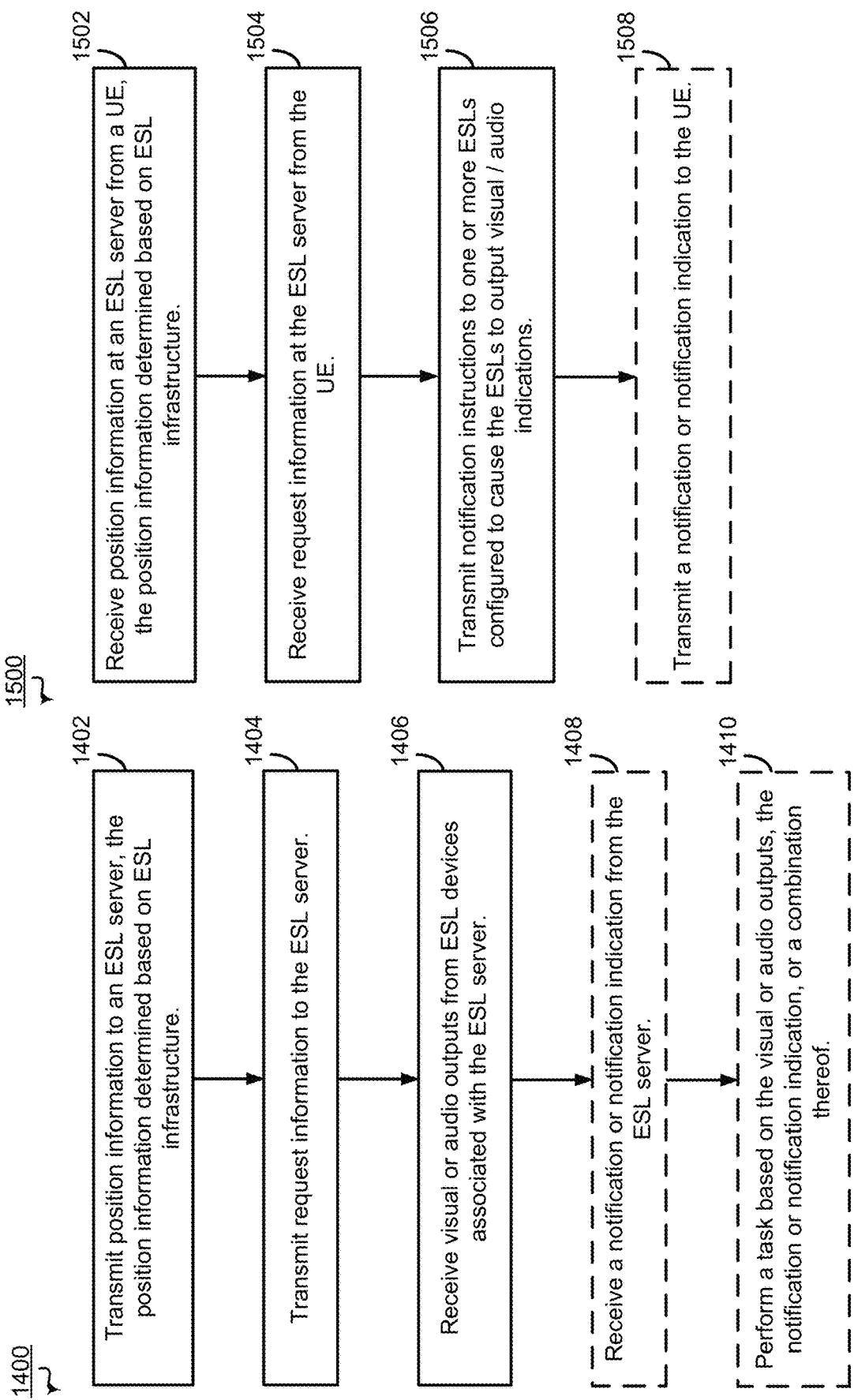

ELECTRONIC SHELF LABEL (ESL) POSITION BASED NOTIFICATIONS

TECHNICAL FIELD

Aspects of the present disclosure relate generally to wireless communication systems, and more particularly, to electronic shelf label (ESL) systems. Some features may enable and provide improved communications, including position based notifications in ESL systems.

INTRODUCTION

In general, retail stores use paper labels to display information about products displayed on shelves, such as prices, discount rates, unit costs, origins, or the like. Using such paper labels for the price display has limitations. For example, when there are changes in product information or locations on shelves, the retailer must generate new paper labels and discard old ones. This raises costs for maintenance in both supplies and employee labor. Further, in environmental terms, replacing the labels wastes raw materials such as paper, which adversely affects the protection of the environment. Still further, humans are prone to making mistakes, such as mislabeling a shelf or product or forgetting to take down temporary price changes on certain shelving, which results in shopper frustration.

Electronic shelf label (ESL) devices are electronic devices for displaying price information for items on retail store shelves, which may be used in place of paper labels. ESL devices may be attached to a front edge of retail shelving and display a variety of pricing information using display devices, such as Liquid Crystal Displays (LCD). Whenever the information about a product or the location of a product is changed, the ESL device may be programmed with new product information. Thus, the electronic shelf label can be repeatedly used.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication includes: obtaining first position information for an asset of one or more assets associated with an electronic shelf label system based on first wireless information, the first position information associated with a first time; obtaining second position information for the asset based on second wireless information, the second position information associated with a second time; and determining a notification for the asset based on the first position information, the second position information, the first time, and the second time.

In an additional aspect of the disclosure, an apparatus includes at least one processor and a memory coupled to the at least one processor. The at least one processor is configured to: obtain first position information for an asset of one or more assets associated with an electronic shelf label system based on first wireless information, the first position information associated with a first time; obtain second position information for the asset based on second wireless information, the second position information associated with a second time; and determine a notification for the asset based on the first position information, the second position information, the first time, and the second time.

In an additional aspect of the disclosure, an apparatus includes: means for obtaining first position information for an asset of one or more assets associated with an electronic shelf label system based on first wireless information, the first position information associated with a first time; means for obtaining second position information for the asset based on second wireless information, the second position information associated with a second time; and means for determining a notification for the asset based on the first position information, the second position information, the first time, and the second time.

In an additional aspect of the disclosure, a non-transitory computer-readable medium stores instructions that, when executed by a processor, cause the processor to perform operations. The operations include: obtaining first position information for an asset of one or more assets associated with an electronic shelf label system based on first wireless information, the first position information associated with a first time; obtaining second position information for the asset based on second wireless information, the second position information associated with a second time; and determining a notification for the asset based on the first position information, the second position information, the first time, and the second time.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 11A and 11B are each a diagram illustrating example ESL position based notifications according to one or more aspects.

FIG. 11C is a diagram of an example formula for enhanced ESL position determination according to one or more aspects.

FIG. 14 is a flow diagram illustrating an example process that supports enhanced ESL position determination and ESL position based notifications according to one or more aspects.

FIG. 15 is a flow diagram illustrating an example process that supports enhanced ESL position determination and ESL position based notifications according to one or more aspects.

Like reference numbers and designations in the various drawings indicate like elements.

DETAILED DESCRIPTION

Figure 1A:
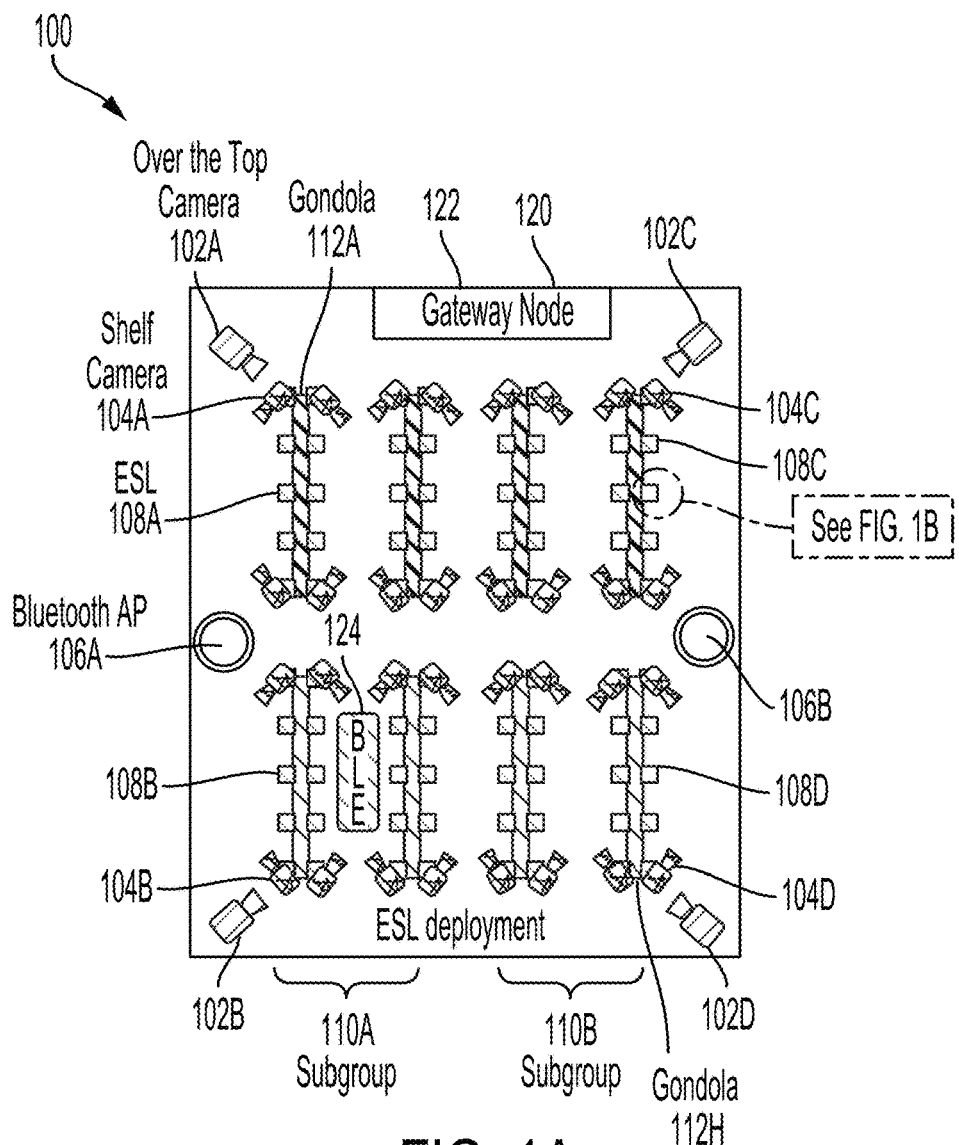
FIG. 1A is a block diagram illustrating an example Electronic Shelf Label (ESL) system according to some embodiments of this disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support enhanced Electronic Shelf Label (ESL) position determination and ESL position based notification operations. The enhanced ESL position determination operations support determination of device position within an ESL system based on ESL infrastructure. The enhanced ESL position determination operations may enable ESL devices or UEs to determine a position based on ESL wireless transmissions. The ESL determined position may then be used to determine and/or transmit notifications which enable automated monitoring of the ESL system and products thereof, and enable improved or additional functionality for users or ESL systems including improved automated task completion.

Particular implementations of the subject matter described in this disclosure may be implemented to realize one or more of the following potential advantages or benefits. In some aspects, the present disclosure provides techniques for wireless communication systems that may be particularly beneficial in ESL applications. For example, the ESL position based determination enables devices of the ESL and outside devices within a range of the ESL to determine a position of itself or ESL devices or assets based on existing ESL transmissions. Thus, position of devices and assets can be determined without additional power consumption, complexity, or signaling overhead. As another example, the enhanced ESL notifications based on the ESL determined positions enable automated asset monitoring and notification generation (e.g., asset misplaced, moved, stolen, etc.) and enable guidance of users and robots within the ESL system. In some such aspects, the ESL system may be able to further configure the ESLs of the system to provide visual or audio clues to help users or robots complete tasks or locate a product.

FIG. 1 is a block diagram illustrating an example Electronic Shelf Label (ESL) system according to some embodiments of this disclosure. An electronic shelf label (ESL) system 100 may include a management server 122 that is integrated with or coupled to a gateway node 120. The management server 122 may include at least one processor coupled to a memory, in which the at least one processor is configured to execute computer program code stored on a computer-readable medium to cause the management server 122 to perform operations related to managing operation of the ESL devices 108A-108D, the APs 106A-106B, the gateway node 120, and/or other components within the ESL system 100. For example, the management server 122 may perform operations relating to ESL based position determination and/or generation of ESL notifications based on ESL based position determinations. For example, the management server 122 may perform operations described with reference to FIGS. 5-10.

The gateway node 120 may communicate with access point (AP) 106A and access point (AP) 106B. Although only two APs are shown in the example system, fewer or more APs may be included in the ESL system 100. The APs 106A and 106B may communicate through a first communication network, either wired or wireless, with the gateway node 120. The APs 106A and 106B also communicate through a second communication network with Electronic Shelf Label (ESL) tag devices. For example, the APs 106A and 106B may communicate with paired ESL devices in an assigned geographic area. In a first geographic assignment 110A, the AP 106A may communicate with ESL device 108A and ESL device 108B; in a second geographic assignment 110B, the AP 106B may communicate with ESL device 108C and ESL device 108D. The first and second communication networks may be different networks. In some embodiments, the first communication network for communication between AP 106A and gateway node 120 is a Wi-Fi network and the second communication network for communication between AP 106A and ESL device 108A is a Bluetooth network.

Bluetooth technology provides a secure way to connect and exchange information between electronic devices, such as smartphones, other cellular phones, headphones, earbuds, smartwatches, laptops, wearables, and/or shelf labels. Bluetooth communications may include establishing wireless personal area networks (PANs) (also referred to as "ad hoc" or "peer-to-peer" networks). These ad hoc networks are commonly called "piconets." Each device may belong to multiple piconets. Multiple interconnected piconets may be called scatternets. A scatternet may be formed when a member of a first piconet elects to participate in a second piconet. In the example of FIG. 1, the ESL device 108A may be in a piconet with the AP 106A.

Because many of the services offered over Bluetooth can expose private data or allow the connecting party to control the connected device, Bluetooth networks may have devices first establish a "trust relationship" before they are allowed to communicate private data to one another. This trust relationship may be established using a process referred to as "pairing," in which a bond is formed between two devices. This bond enables the devices to communicate with each other in the future without further authentication. The ESL device 108A may be bonded in such a manner to the AP 106A. The pairing process may be triggered automatically each time the device is powered on or moved within a certain distance of another Bluetooth device. Pairing information relating to current and previously established pairings may be stored in a paired device list (PDL) in the memory of the Bluetooth device, such as the ESL device 108A and/or the AP 106A. This pairing information may include a name field, an address field, a link key field, and other similar fields (such as "profile" type) useful for authenticating the device or establishing a Bluetooth communication link. The pairing information may allow the ESL device 108A to reconnect to the AP 106A automatically when, for example, power loss causes the ESL system 100 to reset.

A Bluetooth "profile" describes general behaviors through which Bluetooth-enabled devices communicate with other Bluetooth devices. For example, the hands free profile (HFP) describes how a Bluetooth device (such as a smartphone) may place and receive calls for another Bluetooth device, and the Advanced Audio Distribution Profile (A2DP) describes how stereo-quality audio may be streamed from a first Bluetooth device (such as a smartphone) to another Bluetooth device (such as an earbud). The ESL devices 108A-108D may be configured with an Electronic Shelf Label Profile compliant with the Electronic Shelf Label Profile v1.0 dated Mar. 28, 2023, which is incorporated by reference herein. The ESL Profile may specify how the AP 106A may use one or more ESL Services exposed by the ESL device 108A.

The management server 122 may be implemented as a database (DB) server that stores and manages product information regarding products displayed in a distribution store. The management server 122 may store a variety of information used during the operation of a store, as well as product information. Furthermore, the management server 122 may write and manage command messages that are used to carry out various functions such as the synchronization, updating, and alteration of product information displayed on the ESL devices 108A-108D. The management server 122 may be provided with a database for the ESL devices 108A-108D and product information displayed on the ESL devices 108A-108D. That is, the management server 122 may be provided with a database that stores identification information relating to ESL devices 108A-108D in connection with product information displayed on a corresponding one of the ESL devices 108A-108D.

A command message, created by the management server 122 (e.g., a product-information change message or a management-information acquisition message) can be transferred to the gateway node using a message packaged into a packet suitable for a communication scheme used with the gateway node 120, and transfer the configured packet. Furthermore, the management server 122 may receive a reception acknowledgement message, sent from the gateway node 120, through the communication scheme, convert the received message into a message receivable by the management server 122, and transfer the converted message. The messages may include notifications and/or notification instructions based on ESL determined positions as described further with reference to FIG. 5 and FIG. 10.

Although only one gateway node 120 is shown in the ESL system 100, there may be several such gateway nodes communicating with the management server 122. Each gateway node 120 analyzes data received from the management server 122 confirming the presence or absence of a message or data, which is to be sent to the ESL device 108A, and then sends the confirmed message or data to the corresponding ESL device 108A. The gateway node 120 may configure a message, which is to be sent to the ESL device 108A, into a packet according to a communication scheme and send the configured packet to the ESL device 108A through commanding the AP 106A to transmit the packet. Furthermore, the gateway node 120 may transfer a reception acknowledgement message received from the ESL device 108A through the AP 106A to the management server 122.

The ESL devices 108A-108D may include a plurality of ESL devices 108A-108D displaying data concerning product information received from the gateway node 120. The ESL devices 108A-D displaying product information associated with products may be attached to the shelving. One example layout of an ESL system 100 is shown across multiple gondolas 112A-112H. Each of the gondolas 112A-112H may include one or more shelves, to which the ESL devices 108A-108D are attached. The ESL device 108A-108D may be configured as shown, for example, in FIG. 4, with the microcontroller configured to perform operations described with reference to FIGS. 5-17.

In some embodiments, a video monitoring system may be included as part of ESL system 100 or used to augment the capabilities of the ESL system 100. For example, shelf cameras 104A-104D may be positioned with a field of view that captures one or more shelves of one or more of the gondolas 112A-112H. The shelf cameras 104A-104D may be used to assist in tracking stock levels and/or identifying items picked by users while in the environment. As another example, over-the-top (OTT) cameras 102A-102D may be positioned with a field of view capturing large regions of an environment of the ESL system 100. Object recognition systems may be applied to received image frames from the cameras 102A-D or 104A-D to determine a presence of, or count of, objects and humans in the field of view of a respective camera.

The OTT cameras 102A-102D may be used to support determination of a position of an ESL device 108A-D, user mobile device, or other devices within the environment. A mobile device supporting Bluetooth Low Energy (BLE), such as BLE device 124, may traverse the environment and communicate with the ESL devices 108A-108D, for example to receive identification information from the ESL devices 108A-108D, with the location of the ESL devices 108A-D determined by identifying a location of the BLE device 124 from the camera image frames at the time the BLE device 124 receives signals, and/or the strength of the signals, received from the ESL devices 108A-108D.

The ESL devices 108A-108D may change price information or be activated or inactivated while communicating with the gateway node 120. A store manager may send the management server 122 a command concerning the synchronization between a product and the ESL device 108A and/or a command for the correction of information regarding a product assigned to the ESL device 108A. An example ESL device display is shown inset in FIG. 1B, with such a device displaying information including a product description, a product image, a product price, a product barcode, a product rating, a product Stock Keeping Unit (SKU), and/or a product link (e.g., a URL or QR code).

Figure 2A:
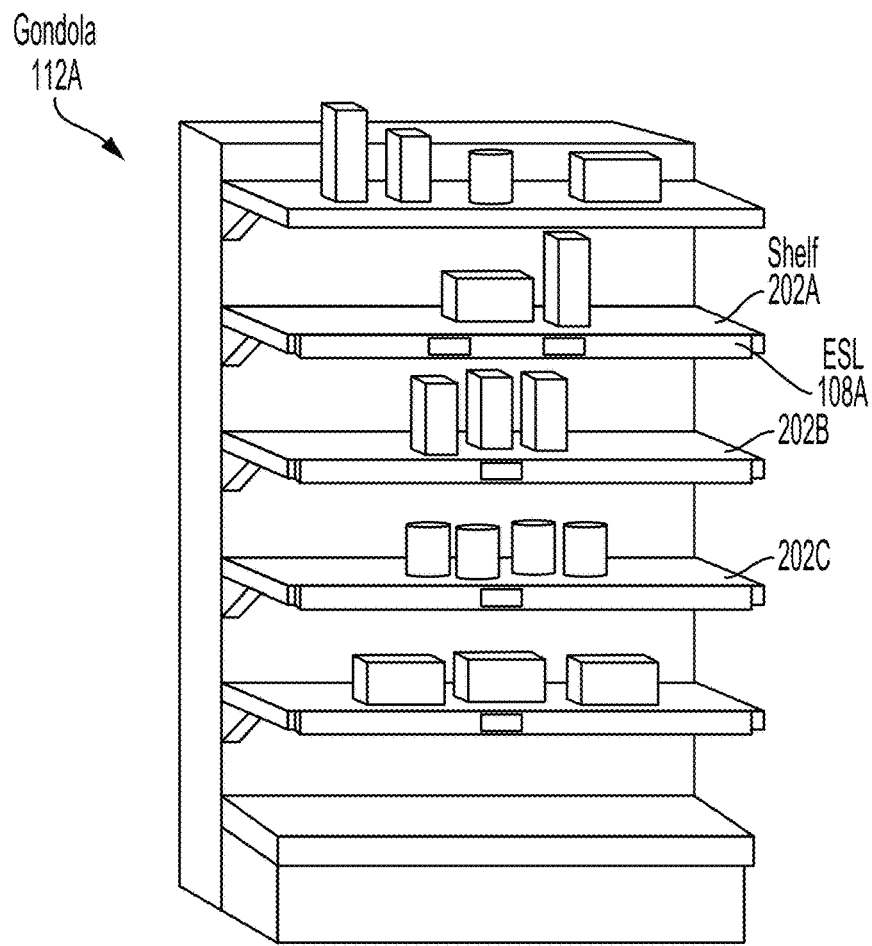
FIG. 2A is a perspective view of a gondola with ESL devices according to some embodiments of the disclosure.

As described earlier, the environment may include ESL devices organized on gondolas and shelves. One example illustration of such an arrangement is shown in FIG. 2A. FIG. 2A is a perspective view of a gondola with Electronic Shelf Label (ESL) devices according to some embodiments of the disclosure. The gondola 112A may include multiple shelves 202A-202C at different vertical levels from a floor. ESL devices may be attached to the shelves 202A-202C. For example, ESL device 108A may be attached to shelf 202A to display information regarding products stocked on shelf 202A in the vicinity of the ESL Device 108A.

Figure 2B:
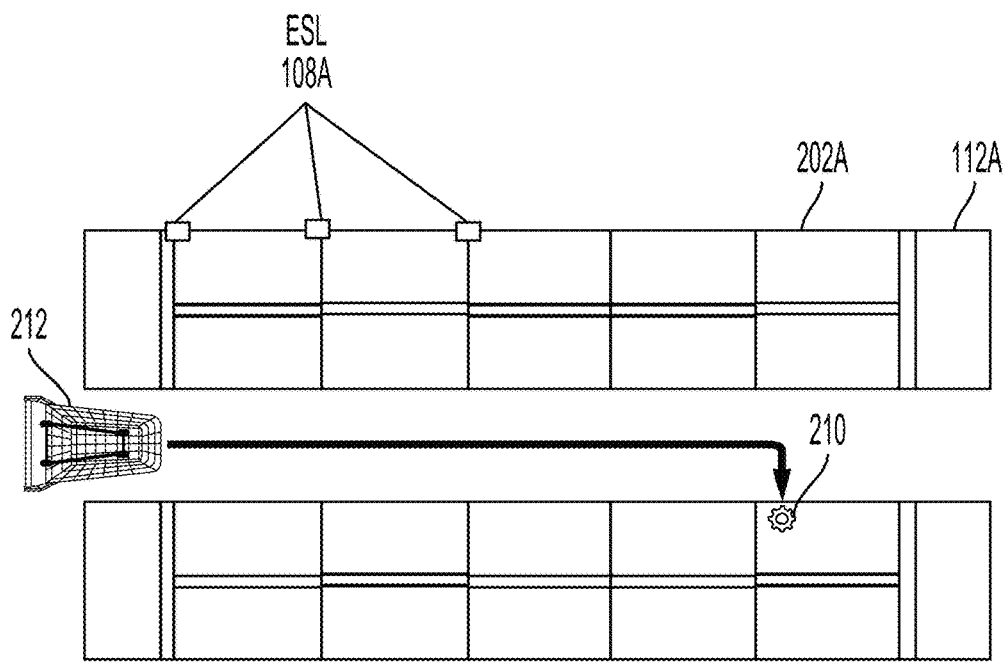
FIG. 2B is a top-down view of a retail environment with ESL devices accessible to a user according to some embodiments of the disclosure.

The ESL devices may provide information to a shopper or store employee operating in the environment, such as to provide information regarding products and/or assist with location determination of products or the user. FIG. 2B is a top-down view of a retail environment with Electronic Shelf Label (ESL) devices accessible to a user according to some embodiments of the disclosure. A user pushing a shopping cart 212 through an aisle may use ESL devices to determine the location of a particular product. For example, a mobile device associated with the shopping cart 212 may guide a user to location 210 where stock for a desired product is located.

Figure 3:
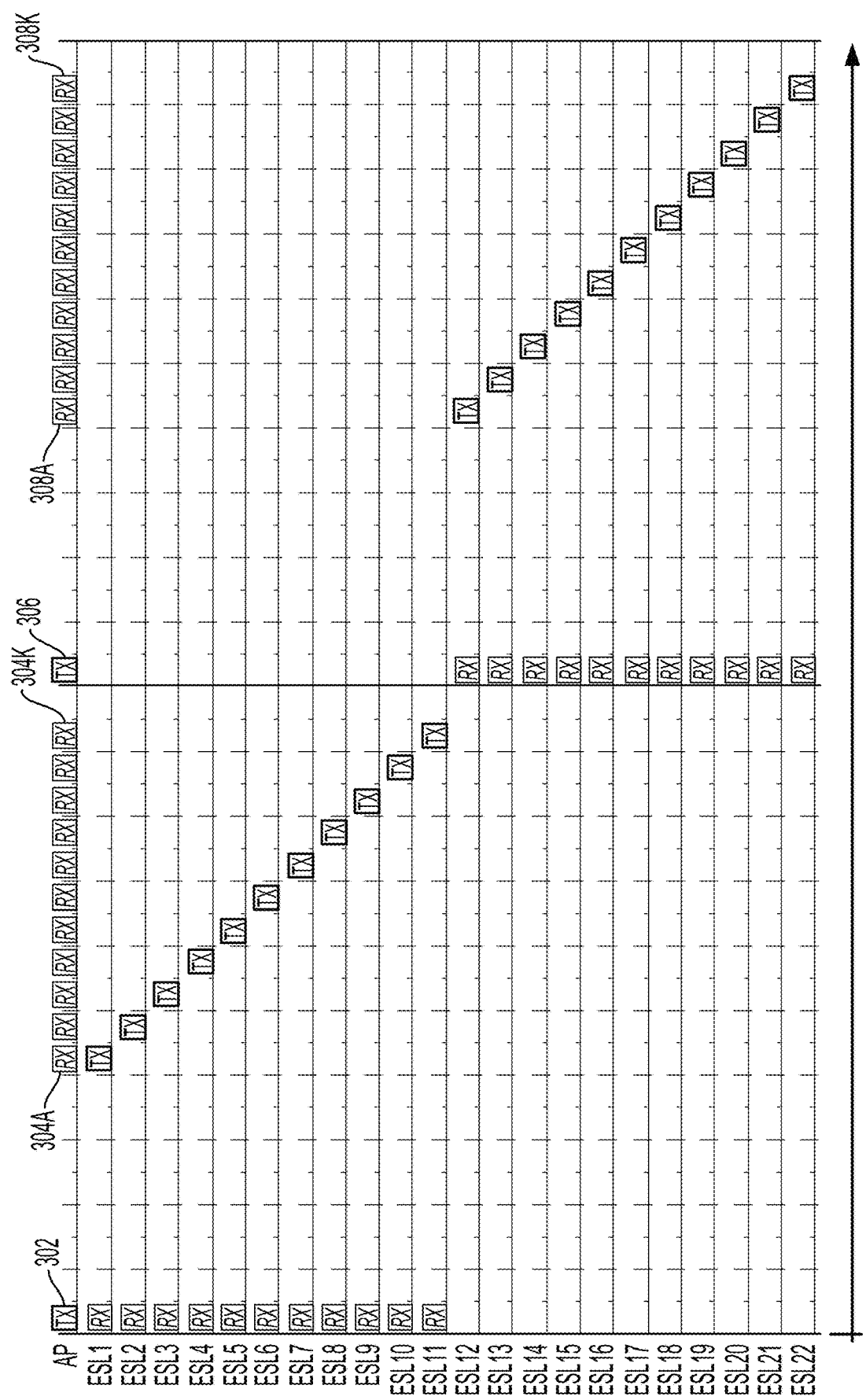
FIG. 3 is a timing diagram illustrating time division multiplexing for communicating with multiple ESL devices according to some embodiments of the disclosure.

Communication within the ESL system 100 between an access point (AP) and Electronic Shelf Label (ESL) devices may be performed according to a Time Division Multiple Access (TDMA) scheme, such as one illustrated in FIG. 3. FIG. 3 is a timing diagram illustrating time division multiplexing for communicating with multiple Electronic Shelf Label (ESL) devices according to some embodiments of the disclosure. An AP, such as AP 106A, may broadcast information that is received by all ESL devices, including ESL device 108A, during a first time period 302. The ESL devices may communicate with the AP during subsequent time periods. For example, a first ESL device, such as ESL device 108A, may transmit in time period 304A, with other ESL devices transmitting in time periods 304B-304K. In ESL systems with significant numbers of ESL devices, the ESL devices may be configured to communicate in different groups. For example, ESL devices 1-11 may be configured to transmit to the AP during a first time cycle and ESL devices 12-22 may be configured to transmit to the AP during a second time cycle. The first and second time cycles may alternate during operation of the wireless network.

Figure 4:
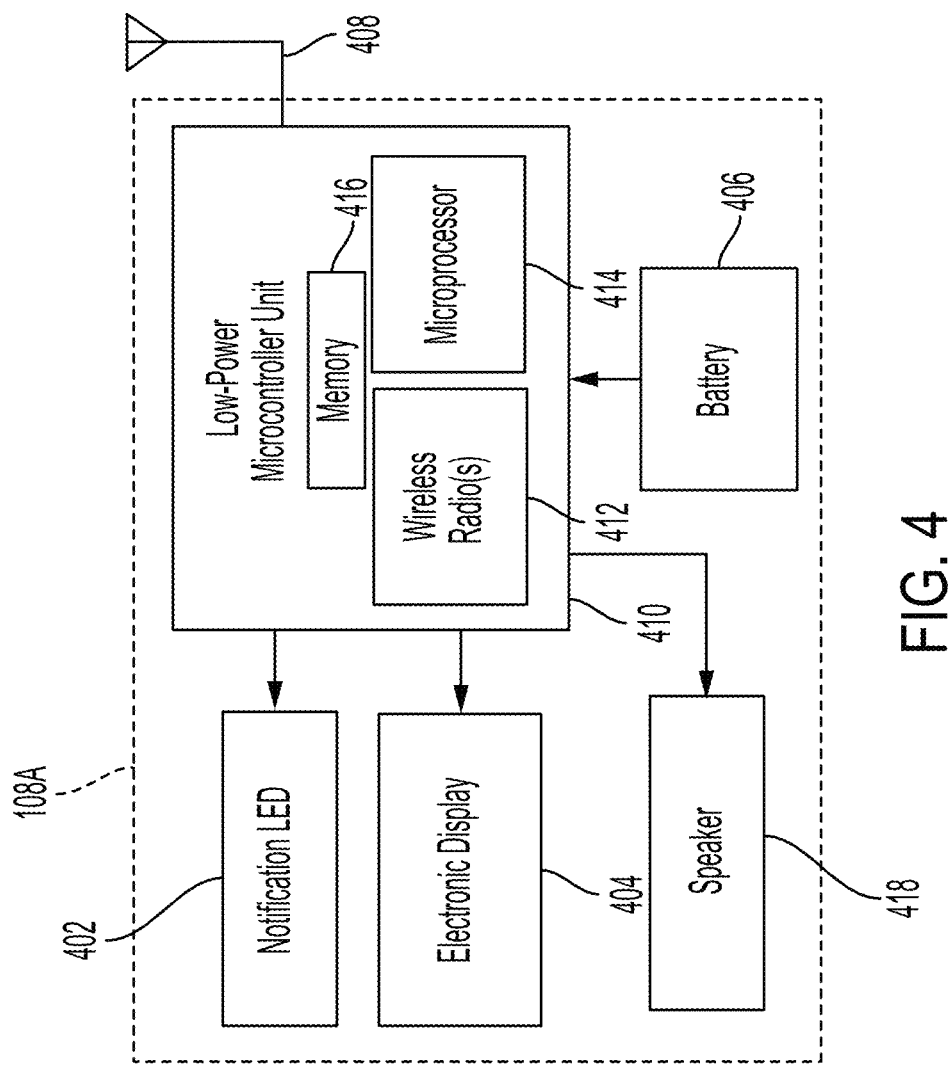
FIG. 4 is a block diagram illustrating an example ESL device according to some embodiments of this disclosure.

An ESL device may include components configured together to provide some or all of the functionality described in this disclosure and/or provide additional functionality. FIG. 4 is a block diagram illustrating an example Electronic Shelf Label (ESL) device according to some embodiments of this disclosure. The ESL device 108A may include a low-power microcontroller 410. Although functionality for the ESL device may be configured by the microcontroller 410 in embodiments of this disclosure, any single or combination of processors (e.g., at least one processor) may be used to perform the functions described according to embodiments of this disclosure.

The microcontroller 410 may include a memory 416. The memory 416 may store computer program code that causes a microprocessor 414 to execute operations that carry out some or all of the functionality described in embodiments of this disclosure. Although shown as part of the microcontroller 410, the memory 416 may be located internal to or external to the microcontroller 410. The microcontroller 410 may also include one or more wireless radio(s) 412. The wireless radios 412 may include, for example, a Bluetooth wireless radio including a front end that couples to antenna 408 for transmitting and receiving radio frequency (RF) signals at one or more frequencies in one or more frequency bands. In some embodiments, the microcontroller 410 is a System on Chip (SoC) in which two or more components of the wireless radio(s) 412, the microprocessor 414, and/or the memory 416 are included in a single semiconductor package. In some embodiments, the two or more components may be included on a single semiconductor die.

The ESL device 108A may include I/O devices, such as a notification LED 402 and/or an electronic display 404. The notification LED 402 may include one or more light emitting diodes (LEDs), or other light sources configured to flash one or more colors. The notification LED may be triggered to blink at a specific time and/or with a specific color based on a command received from the gateway node 120. For example, a notification LED 402 may blink to attract a user's attention to a particular location on a shelf. The electronic display 404 may be, for example, an electronic-ink (e-Ink) display configured to output the product information. In some implementations, the ESL device 108A may include a speaker 418. The speaker 418 may include one or more audio output devices configured to output audio signals. For example, the speaker 418 may output tones, beeps, bell or chime sounds, or speech.

The ESL device 108A may couple to a battery 406 or other power source to power operations performed by the ESL device 108A, such as to operate the wireless radio(s) 412, the notification LED 402, the electronic display 404, the memory 416, the speaker 418, and/or the microprocessor 414. The battery 406 may allow placement of the ESL device 108A in a place where constant power supply is difficult. Thus, in order that a single battery charge provides a long period of use (e.g., lasting longer than several years), the ESL device 108 may be configured to reduce power consumption during times when frequent commands are not expected. For example, the ESL device 108A may operate using a wakeup communication scheme. That is, the ESL device 108A wakes up according to predetermined time intervals to determine whether data is waiting to be received. When no data is waiting, power to the ESL device 108A is turned off until the next wakeup period to reduce power consumption. When there is data to be received, the ESL device 108A wakes up to perform communication operations.

Figure 5:
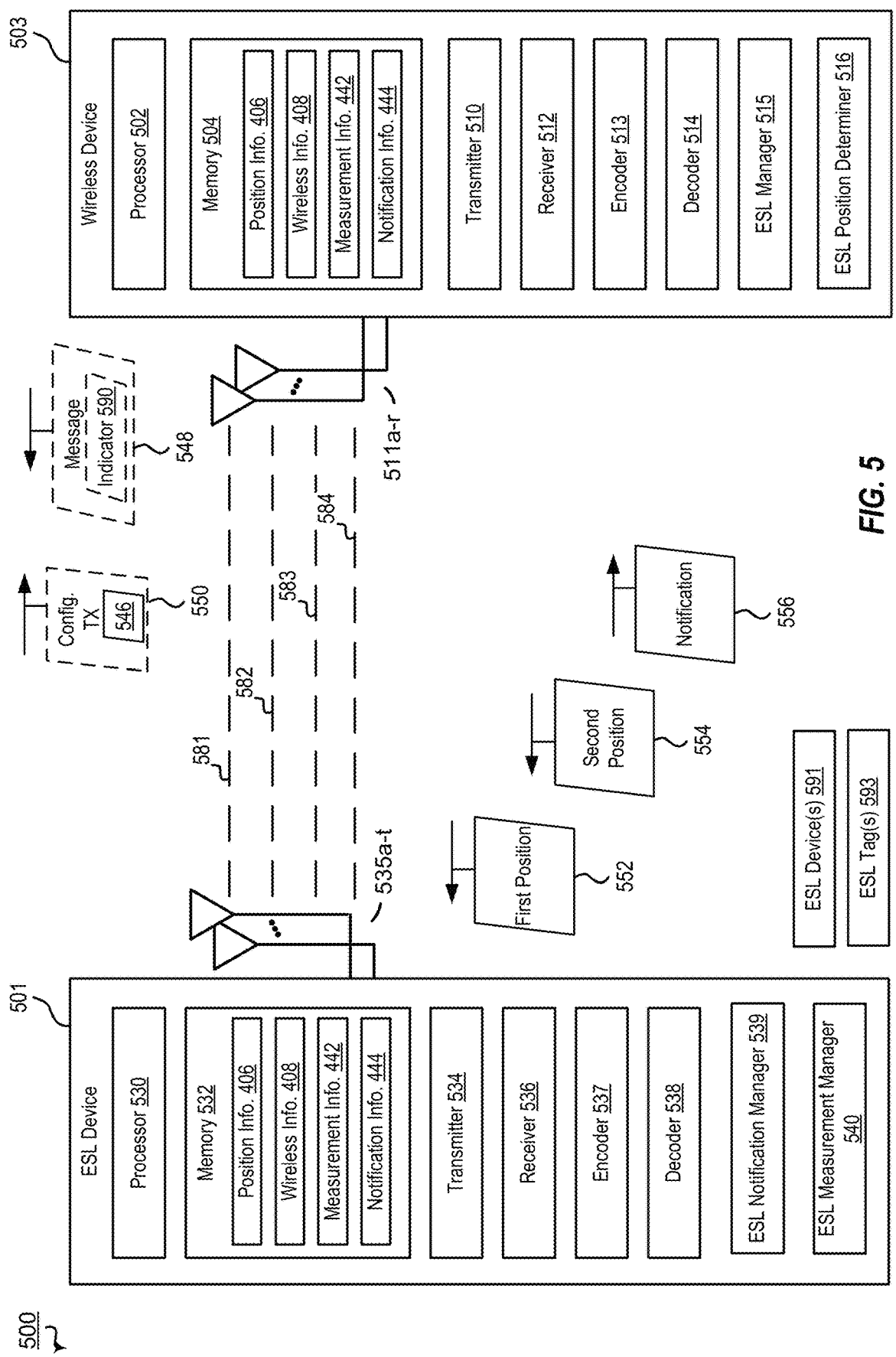
FIG. 5 is a block diagram illustrating an example wireless communication system that supports enhanced ESL position determination and ESL position based notifications according to one or more aspects.

FIG. 5 illustrates an example of a wireless communications system 500 that supports enhanced ESL position determination and ESL position based notification operations in accordance with aspects of the present disclosure. In some examples, the wireless communications system 500 may implement aspects of ESL system 100. For example, the wireless communications system 500 may include an ESL network, such as ESL infrastructure including one or more ESL devices or network entities, and one or more wireless devices which interact with the ESL infrastructure. The wireless devices may include UEs, such as UE 115. As illustrated in the example of FIG. 5, the wireless communications system 500 includes an ESL device 501 and a wireless device 503.

Figure 1B:
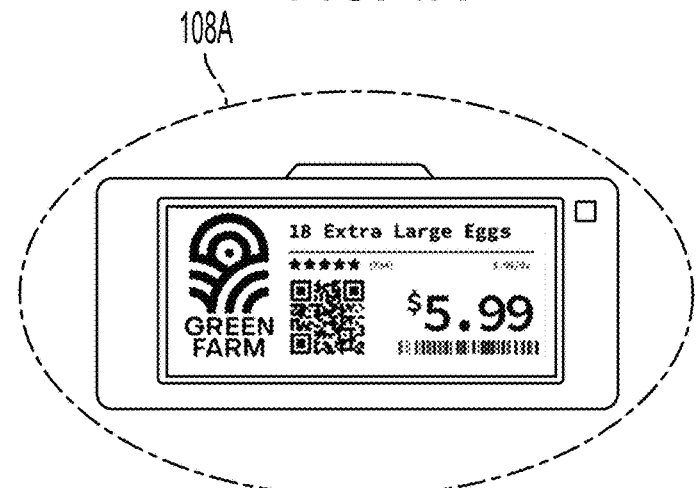
FIG. 1B is a diagram illustrating an example display of an ESL device.

The ESL device 501 may include or correspond to any of the ESL devices or infrastructure described herein, including the gateway node 120, the management server 122, an ESL AP (e.g., the AP 106A or 106B), an ESL device or controller (e.g., ESL devices 108C or 108D), an ESL tag device (e.g., IoT Tags) as in FIG. 1A, or the ESL device 400 of FIG. 4. An ESL controller may include one or more ESL devices and a wireless radio and be referred to as an ESL rail controller.

The wireless device 503 may include or correspond to a UE that interacts with ESL infrastructure, or to a second ESL device. The UE may be part of the ESL infrastructure or separate from the ESL infracted. For example, the UE may be associated with a worker or a robot, or with a customer/shopper. The second ESL device may include any of the ESL devices of ESL device 501 and may include or correspond to a different type of ESL device from the ESL device 501. As illustrative, non-limiting examples, the ESL device 501 may include or correspond to an ESL controller associated with one or more ESLs and the wireless device 503 may include or correspond to an ESL AP, an ESL server, or an IoT tag associated with a product or asset of the ESL network.

As illustrated in the example of FIG. 5, the wireless communications system 500 may further include one or more second ESL devices 591, one or more ESL tags 593 (e.g., IoT tags). The one or more second ESL devices 591 may include or correspond to an ESL device which is the same type as or a different type from a type of the ESL device 501, a type of the wireless device 503, or both. The ESL tags 593 may include or correspond to passive or battery-less radios which may output a signal or beacon based on received RF energy. The ESL tags 593 may be coupled to or associated with one or more products or assets of the ESL system. In a particular implementation, the one or more second ESL devices 591 may include an energizer device configured to provide RF energy to the ESL tags 593 and/or trigger the ESL tags 593 to broadcast beacons for measurement.

Enhanced ESL position determination and ESL position based notification operations may provide additional functionality for the ESL network and devices which interact with the ESL network. For example, enhanced ESL position determination may enable increased positional accuracy and lower power consumption for determining positions of devices and assets within an ESL network. Additionally, the enhanced ESL position determination may enable enhanced ESL position based notification which can help automate tasks and/or assist in tasks related to operation and maintenance of the ESL network. Accordingly, ESL network and device performance can be increased.

ESL device 501 and wireless device 503 may be configured to communicate via one or more portions of the electromagnetic spectrum. For example, the ESL device 501, the wireless device 503, or both, may be configured to communicate via one or more portions of the electromagnetic spectrum associated with Bluetooth transmissions, Wi-Fi transmissions, or cellular transmissions (including sub-6 GHz and 6 GHz).

ESL device 501 and wireless device 503 may be configured to communicate via one or more channels or component carriers (CCs), such as representative first channel 581, second channel 582, third channel 583, and fourth channel 584. Although four channels are shown, this is for illustration only, more or fewer than four channels may be used. One or more channels may be used to communicate control channel transmissions, data channel transmissions, and/or sidelink channel transmissions.

Each channel or CC may have a corresponding configuration, such as configuration parameters/settings. The configuration may include bandwidth, bandwidth part, HARQ process, TCI state, RS, control channel resources, data channel resources, or a combination thereof. Additionally, or alternatively, one or more channels or CCs may have or be assigned to a Cell ID, or a Bandwidth Part (BWP) ID. The Cell ID may include a unique cell ID for the channel or CC, a virtual Cell ID, or a particular Cell ID of a particular channel or CC of the plurality of channels or CCs. Additionally, or alternatively, one or more channels or CCs may have or be assigned to a HARQ ID. Each channel or CC may also have corresponding management functionalities, such as, beam management or BWP switching functionality. In some implementations, two or more channels or CCs are quasi co-located, such that the channels or CCs have the same beam and/or same symbol.

In some implementations, control information may be communicated via ESL device 501 and wireless device 503. For example, the control information may be communicated using Bluetooth transmissions, Wi-Fi transmission, MAC-CE transmissions, RRC transmissions, DCI (downlink control information) transmissions, UCI (uplink control information) transmissions, SCI (sidelink control information) transmissions, another transmission, or a combination thereof.

Wireless device 503 can include a variety of components (e.g., structural, hardware components) used for carrying out one or more functions described herein. For example, these components can include processor 502, memory 504, transmitter 510, receiver 512, encoder, 513, decoder 514, ESL manager 515, ESL position determiner 516, and antennas 511a-r. Processor 502 may be configured to execute instructions stored at memory 504 to perform the operations described herein. In some implementations, processor 502 includes or corresponds to the microcontroller unit 410 and/or the microprocessor 414 of FIG. 4, and memory 504 includes or corresponds to the memory 416 of FIG. 4. Memory 504 may also be configured to store position information 506, wireless information 508, measurement information 542, notification information 544, ESL settings information 546, or a combination thereof, as further described herein.

The position information 506 includes or corresponds to data associated with or corresponding to a position of a device or an asset of the wireless communications system 500 or associated with or interacting with the wireless communications system 500. The position indicated by the position information 506 may include or correspond to an ESL or ESL based position which is determined based on ESL system information and/or ESL wireless transmissions. For example, the position information 506 may include data used for determining a position (e.g., measurement data), data indicating a position, data indicating formulas or methods for calculating a position, or a combination thereof. The position information 506 may enable the generation of notifications (e.g., notification information, indications and/or instructions). The position information may include positions for ESL devices, assets, and UEs associated with the network. Additionally, the position information 506 may include original or programmed positions and/or determined or updated positions (e.g., ESL based or ESL determined positions). The ESL based or determined positions are determined based on measurement information associated with ESL transmissions.

In some implementations, the position information includes location information. The location information includes or corresponds to data associated with or corresponding to a location of an ESL device of the wireless communications system 500. For example, the location information may include data used for determining a location (e.g., measurement data), data indicating a location, data indicating formulas or methods for calculating a location, or a combination thereof. The location information may include or correspond to an initial or original position or location of ESL devices or ESL infrastructure of the wireless communications system 500.

The wireless signal information 508 includes or corresponds to data associated with or corresponding to wireless signals of the wireless communications system 500. For example, the wireless signal information 508 may include data associated with Bluetooth or Wi-Fi transmissions and may enable the generation of measurement information and/or position information.

The measurement information 542 includes or corresponds to data associated with or corresponding to measurements of wireless signals of the wireless communications system 500. For example, the measurement information 542 may include measurement data or measurement values associated with transmissions (e.g., Bluetooth or Wi-Fi transmissions) of the wireless communications system 500 and may enable the generation of position/location information. The measurement information 542 may include signal strength or quality measurements, such as RSRP, RSRQ, RSSI, etc. Additionally, or alternatively, the measurement information 542 may include directionality information, such as angle or arrival (AoA) or beam information.

The notification information 544 includes or corresponds to data associated with or corresponding to notifications for devices or assets of or associated with the wireless communications system 500. For example, the notification information 544 may include notifications for assets of the wireless communications system 500. To illustrate, the notification may indicate a position and/or status of an IoT tag coupled to an asset. As illustrative examples, the notification may indicate asset moved, asset misplaced, asset stolen, asset not responding, etc.

An asset moved notification may correspond to a notification based on time and position information. For example, one or more threshold periods of time or durations may be used to determine whether an asset moved. The duration may correspond to a beacon interval or multiple beacon intervals. To illustrate, if a position of the asset has changed after a first duration of multiple beacon intervals and remains unchanged thereafter for a second duration of multiple beacon intervals, it is assigned a status of asset moved and notification may be generated and/or transmitted to another device. The first duration and the second duration may be the same of different durations. In other implementations, a threshold amount of times with a same or similar position may be used as an alternative to a duration or in combination with the duration to determine any of the notifications.

An asset misplaced notification may correspond to a notification based on time and position information, and optionally another notification, such as a prior asset moved notification. For example, if an asset is determined to be in another area or section outside of its section or original position for another duration, such as third duration, the asset may be indicated as misplaced. To illustrate, if a food asset is outside of a food section, within a clothes section, and not within a checkout section or passed through a checkout section, an asset misplaced notification may be generated and/or transmitted. The third duration may be the same as the first or second durations or different from one or more of the first or second durations. In a particular implementation, the third duration is much longer than the other durations, to enable a shopper to complete their trip and not provide false positives and/or may be based on the item. For example, clothes may have longer third duration than refrigerator or frozen foods.

An asset stolen notification may correspond to a notification based on time and position information, and optionally another notification, such as a prior asset moved notification. For example, if an asset has determined to have been moved or misplaced and has not been checked out after a fourth duration, an asset stolen notification may be generated. The fourth duration may be the same as the first, second, or third durations or different from one or more of the first, second, or third durations. In some implementations, the asset stolen notification may be further generated based on a purchase or check-out status, whether the object is still in a coverage range, whether the object has passed through a particular area (e.g., checkout or entrance/exit), or a combination thereof. To illustrate, only a subset of assets, which have not been checked our and/or passed through an exit, of all of the assets that have been moved or misplaced and not moved for a fourth duration will be indicated as stolen.

An asset not responding notification may correspond to a notification based on time and position information, and optionally another notification, such as a prior asset moved notification. For example, if an asset has determined to have been moved or misplaced and then is determined have a position within coverage and has not moved for a fifth duration, an asset not responding notification may be generated. To illustrate, if an asset has been moved and then determined to be stationary for a period of time before losing contact and without being checked out or moving out of range or near an entrance/exit, an asset not responding notification may be generated and/or transmitted. As another example, the asset not responding may be determined based on position and independent of time. For example, if the asset has a same position for X amount of time, and then is no longer detectable, an asset not responding notification may be generated and/or transmitted.

As another example, the notification information 544 may include notifications for devices of the wireless communications system 500. To illustrate, the notification information 544 may include notifications for the ESL device 501, the wireless device 503, or both. In some such implementations, the notifications for devices of the wireless communications system 500 may include notifications for or to be outputted by an ESL, and which provide a notification to a UE associated with the wireless communications system 500.

Additionally, or alternatively, the notification information includes notification conditions or thresholds, such as notification condition information or notification thresholds information, for determining a notification or when to transmit a notification. In some implementations, the notification information includes notification history information and/or notification filtering information. The notification history information may include past notifications for devices or assets of the ESL system and the notification filtering information may indicate when to not determine notifications and/or when to not send notifications, such as when restocking or performing another ESL system task.

The ESL settings information 546 includes or corresponds to data associated with enhanced ESL position determination operations and/or enhanced ESL position based notification operations. The ESL settings information 546 may include one or more types of enhanced ESL position determination operation modes and/or enhanced ESL position based notification operation modes and/or thresholds or conditions for switching between such enhanced modes and/or configurations thereof. For example, the ESL settings information 546 may have data indicating different thresholds and/or conditions for different enhanced ESL position determination modes and/or enhanced ESL position based notification modes, or a combination thereof.

Additionally, or alternatively, the ESL settings information 546 includes asset information, ESL device information, gondola information, store information, ESL transmission timing information (e.g., beacon timing information), UL and/or DL position determination modes, associated UE information, or a combination thereof.

Transmitter 510 is configured to transmit data to one or more other devices, and receiver 512 is configured to receive data from one or more other devices. For example, transmitter 510 may transmit data, and receiver 512 may receive data, via a network, such as a wired network, a wireless network, or a combination thereof. For example, wireless device 503 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 510 and receiver 512 may be replaced with a transceiver. Additionally, or alternatively, transmitter 510 or receiver 512 may include or correspond to one or more components of ESL device 108A described with reference to FIG. 4.

Encoder 513 and decoder 514 may be configured to encode and decode data for transmission. ESL manager 515 may be configured to perform enhanced ESL position based operations. For example, the ESL manager 515 may be configured to determine ESL based positions for ESL devices or ESL assets and/or determined ESL notifications based on ESL based positions. The ESL manager 515 may be configured to generate notifications or notification information based on measurement information, position information, time information, or a combination thereof.

ESL position determiner 516 may be configured to perform ESL position determination and management operations. For example, the ESL position determiner 516 may be configured to determine enhanced ESL based positions based on ESL information and transmissions. The ESL position determiner 516 may be configured to determine one or more positions of ESL devices based on measurements of beacons and/or reference signal(s). Additionally, the ESL position determiner 516 may be configured to extract position or location information of other ESL devices from ESL transmissions. The position information may be used to determine notification information.

Although one wireless device (i.e., wireless device 503) is shown in the example of FIG. 5, in other implementations the network may include additional wireless devices which interact with the ESL infrastructure (e.g., ESL device 501). The other wireless device or devices may include one or more elements similar to wireless device 503. In some implementations, the wireless device 503 and the other wireless device or devices are different types of UEs. For example, either UE may be a higher quality or have different operating constraints. To illustrate, one of the UEs may have a larger form factor or be a current generation device, and thus have more advanced capabilities and/or reduced battery constraints, higher processing constraints, etc. As another example, one UE may be associated with a person and the other UE may be associated with a robot or autonomous device.

ESL device 501 includes processor 530, memory 532, transmitter 534, receiver 536, encoder 537, decoder 538, ESL notification manager 539, ESL measurement manager 540, and antennas 535a-t. Processor 530 may be configured to execute instructions stores at memory 532 to perform the operations described herein. In some implementations, processor 530 includes or corresponds to low-power microcontroller unit 410 and/or microprocessor 414, and memory 532 includes or corresponds to memory 416 of FIG. 4. Memory 532 may be configured to store position information 506, wireless information 508, measurement information 542, notification information 544, ESL settings information 546, or a combination thereof, similar to the wireless device 503 and as further described herein.

Transmitter 534 is configured to transmit data to one or more other devices, and receiver 536 is configured to receive data from one or more other devices. For example, transmitter 534 may transmit data, and receiver 536 may receive data, via a network, such as a wired network, a wireless network, or a combination thereof. For example, UEs and/or ESL device 501 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 534 and receiver 536 may be replaced with a transceiver. Additionally, or alternatively, transmitter 534 or receiver 536 may include or correspond to one or more components of ESL device 108A described with reference to FIG. 4.

Encoder 537, and decoder 538 may include the same functionality as described with reference to encoder 513 and decoder 514, respectively. ESL notification manager 539 may be configured to perform ESL notification determination and management operations. For example, the ESL notification manager 539 may be configured to generate and/or transmit enhanced ESL notifications, such as ESL notifications based on ESL based or determined positions. The ESL notification manager 539 may be configured to determine notifications for assets, determine when and how to send the determined notifications, determine whether to send the determined notifications, or a combination thereof. Additionally, the ESL notification manager 539 may be configured to generation instructions for causing other ESL devices and/or UEs to output notifications, such as visual or auditory outputs, to provide a notification, such as directions, to a user or a UE. In some implementations, the ESL notification manager may include a notification filter configured to filter the generation and/or transmission of notifications.

ESL measurement manager 540 may be configured to perform ESL position measurement and management operations. For example, the ESL measurement manager 540 may be configured to measure received reference signals or beacons (e.g., beacons and/or beacon responses) to determine wireless information, measurement information, or both. The measurement information may be used to determine position information.

In some implementations, the ESL device 501 may include similar functionality as described with reference to the ESL manager 515, the ESL position determiner 516, or both, of the wireless device 503. Additionally, or alternatively, the wireless device 503 may include similar functionality as described with reference to the ESL notification manager 539, the ESL measurement manager 540, or both, of the ESL device 501. In some such implementations, the ESL device 501 may not include one or more of the ESL notification manager 539 or the ESL measurement manager 540, and/or the wireless device 503, may not include one or more of the ESL manager 515 or the ESL position determiner 516.

During operation of wireless communications system 500, the network (e.g., ESL device 501) may determine that wireless device 503 has ESL position determination and/or ESL position based notification capability. For example, wireless device 503 may transmit a message 548 that includes an ESL position determination and/or ESL position based notification indicator 590 (e.g., an enhanced ESL position operations indicator). Indicator 590 may indicate ESL position determination and/or ESL position based notification capability for one or more communication modes, such as uplink, downlink, sidelink, etc. In some implementations, an ESL network entity (e.g., the ESL device 501) sends control information to indicate to the wireless device 503 that ESL position determination and ESL position based notification operation and/or a particular type of ESL position determination and ESL position based notification operation is to be used. For example, in some implementations, configuration transmission 550 is transmitted to the wireless device 503. The configuration transmission 550 may include or indicate to use enhanced ESL position determination operations or enhanced ESL position based notification operations or to adjust or implement a setting of a particular type of ESL position determination operation or ESL position based notification operation. For example, the configuration transmission 550 may include position information 506, notification information 544, ESL settings information 546, or any combination thereof.

During operation, devices of wireless communications system 500 perform ESL position determination and ESL position based notification operations. For example, the ESL network and wireless devices may exchange transmissions via uplink, downlink, and/or sidelink communications over the communication links and engage in ESL position determination and ESL position based notification, as illustrated in the example of FIG. 5. ESL position determination operations enables enhanced position determination within an ESL system based on transmissions of the ESL, such as between or by ESL devices of the ESL system, and enable ESL notification based on the position, referred to as ESL position based notifications. The enhanced ESL position based notification operations enable ESL devices and/or wireless devices to have increased operational capabilities and the ESL network to have increased automation due to asset monitoring and device guidance and assistance, which improves the functionality and efficiency of ESL systems and devices.

In the example of FIG. 5, the ESL device 501 obtains first position information 552. For example, the ESL device 501 may receive the first position information 552 via wireless transmission from another device or via manual configuration. The first position information 552 may include or correspond to an initial position which is manual entered or preconfigured, or to an ESL determined position. Examples of receiving first position information 552 are described further with reference to FIGS. 6-10, and may include an ESL server, ESL AP, or ESL controller receiving ESL based position information from and determined by a UE.

As another example, the ESL device 501 may generate the first position information 552 based on one or more received signals from one or more other ESL devices and/or wireless devices, which may include the wireless device 503. To illustrate, the ESL device 501 may receive beacon transmissions from multiple devices and determine measurement information for the beacon transmissions. The ESL device 501 may determine a position of the ESL device 501 or for another wireless device, such as an IoT tag (e.g., ESL tag 593). Examples of determining first position information are described further with reference to FIGS. 6-10, and may include an ESL server, ESL AP, or ESL controller determining position information for an ESL device or an ESL asset (an IoT tag attached to the asset) based on at least a wireless signal from the ESL device or the ESL asset.

The ESL device 501 obtains second position information 554. The second position information 554 may be obtained in a manner similar to obtaining the first position information 552, or in a different manner. For example, the ESL device 501 may receive the second position information 554 via wireless transmission from another device. The second position information 554 may include or correspond to an ESL determined position. Examples of receiving second position information 554 are described further with reference to FIGS. 6-10, and may include an ESL server, ESL AP, or ESL controller receiving ESL based position information from and determined by a UE.

As another example, the ESL device 501 may generate the second position information 554 based on one or more received signals from one or more other ESL devices and/or wireless devices, which may include the wireless device 503. To illustrate, the ESL device 501 may receive beacon transmissions from multiple devices and determine measurement information for the beacon transmissions. The ESL device 501 may determine a position of the ESL device 501 or for another wireless device, such as an IoT tag (e.g., ESL tag 593). Examples of determining first position information are described further with reference to FIGS. 6-10, and may include an ESL server, ESL AP, or ESL controller determining position information for an ESL device or an ESL asset (an IoT tag attached to the asset) based on at least a wireless signal from the ESL device or the ESL asset. In some implementations, the second position information 554 may be determined based on the first position information 552. Generation of position information is described further with reference to FIGS. 6-11B, and an example equation for determination of a position based on RSSI is illustrated and described with reference to FIG. 11C.

The ESL device 501 generates a notification 556 based on the first position information 552 and the second position information 554. In some implementations, the ESL device 501 generates the notification 556 further based on a first time associated with the first position information 552 and on a second time associated with the second position information 554. As described above, the notification 556 may include or correspond to a notification for a particular asset in some implementations. For example, the notification 556 may include a notification for the ESL system (e.g., a UE or ERP system associated with the ESL system) and regarding an asset or ESL device of the system. To illustrate, the notification may indicate a status of the asset, such as moved, misplaced, missing, stolen, not responding, etc., and/or indicate a status of a class of assets, such as stock running low, out of stock, etc. or a status of the ESL system, such as restocking event, position calibration event, reorganizing event, etc.

In other implementations, the notification 556 may include or correspond to a notification for a particular ESL device or UE. For example, the notification 556 may include a notification for an ESL and which is configured to cause a display, LED, or speaker of the ESL to output a visual output, an audio output, or both. The visual and/or audio output may be directed at or intended for a UE device (or user thereof) to provide directions to an asset or to assist with an ESL system related task (e.g., restocking, organizing, shopping, etc.) As another example of a notification for a UE, the notification 556 may include a notification for a UE device which is configured to cause a display, LED, or speaker of the UE to output a visual output, an audio output, or both to indicate directions or guidance to an ESL device, an asset, or both. In a particular implementations, the ESL device 501 may generate both types of notifications.

The ESL device 501 may then transmit notification 556 to one or more devices of the ESL network. For example, the ESL device 501 may send one or more transmissions including or indicating the notification 556, or based on the notification 556. In some implementations, the ESL device 501 transmits the notification 556 to the wireless device 503, and optionally other devices. Generation of notifications, transmission of notifications, and illustrative examples of notifications are described further with reference to FIGS. 6-11B.

Accordingly, the network (e.g., the ESL device 501 and the wireless device 503) may be able to perform enhanced ESL position determination and/or ESL position based notification operations. Accordingly, the ESL network performance and ESL network and user experience may be increased due to enhanced ESL system capabilities based on ESL based positions and notifications.

Figure 6:
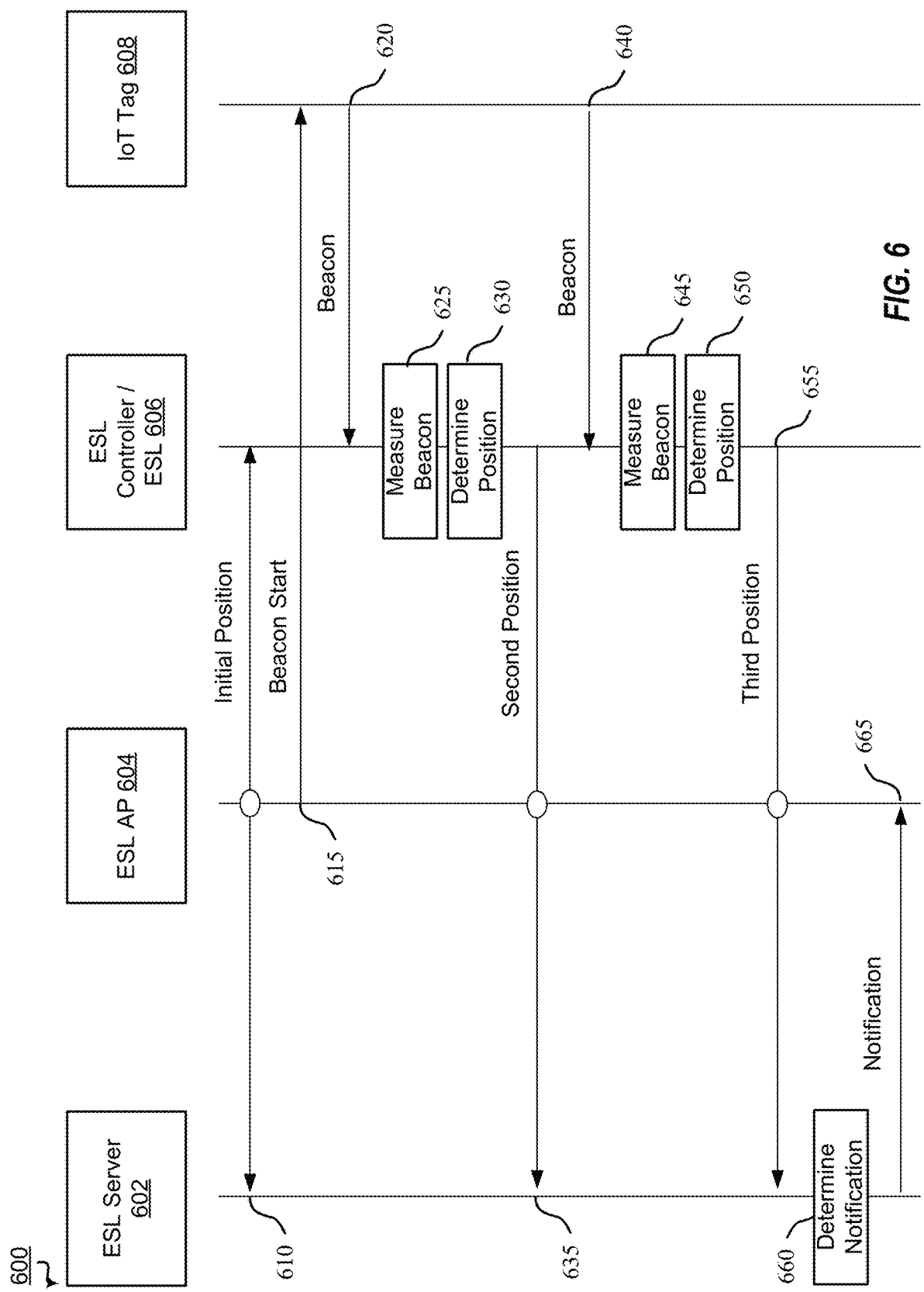
FIG. 6 is a timing diagram illustrating an example process that supports enhanced ESL position determination and ESL position based notifications according to one or more aspects.

Referring to FIG. 6, FIG. 6 is a timing diagram 600 illustrating an ESL system that supports enhanced position determination and position based notifications according to one or more aspects. The example of FIG. 6 corresponds to an example of uplink position determination by an ESL device where the position is determined based on signals or beacons from IoT tags, which may be triggered by an ESL device. The example FIG. 6 may enable determination of ESL based positions by one or more ESL infrastructure devices.

In the example of FIG. 6, the ESL system includes an ESL server 602, an ESL AP 604, an ESL controller 606, and an IoT tag 608. The ESL controller 606 may include or correspond to an ESL with a wireless radio or a wireless device/radio associated with a plurality of ESLs.

At 610, the ESL system may be configured with initial position information. For example, an operator may setup or preconfigure the system with initial positions for one or more devices and/or assets of the ESL systems. To illustrate, one or more of ESL APs, ESL controllers, ESLs, or assets (which may be tagged with an IoT tag) may be configured with an initial position. As another example, the ESL system may enter, such as upon initial setup, reconfiguration, or periodically (e.g., nightly weekly, monthly, quarterly, etc.), a measurement mode to determine initial or updated positions.

In the example of FIG. 6, the ESL server 602 and the ESL controller 606 determine and exchange initial position information. For example, the operator may input a position into the ESL controller 606, and the ESL controller 606 may relay that position to the ESL server 602 via the ESL AP 604. As another example, the operator may configure the ESL server with the position of the ESL controller 606, which is then relayed to the ESL controller 606 via the ESL AP 604. As yet another example, the ESL controller 606 determines its position based on a beacon of the ESL AP 604, and transmits its determined position to the ESL server 602.

At 615, the ESL AP 604 may initiate beacon transmissions by ESL devices. For example, the ESL AP 604 may transmit a beacon start transmission, such as the broadcast transmission at 302 of FIG. 3. To illustrate, the ESL AP 604 may broadcast a transmission which is configured to cause ESL controllers, including ESL controller 606, to transmit beacon transmissions, cause IoT tags to transmit beacon transmissions, or both. The beacon start message may include or correspond to a configuration transmission. In other implementations, the transmission is an energizer start transmission, which initiates one or more energizers to transmit signals to provide energy for IoT tags to transmit beacons.

At 620, the IoT tags transmit beacons. For example, the IoT tag 608 transmits a first beacon. To illustrate, the IoT tag 608 broadcasts the first beacon based on received RF energy. The RF energy may be harvested from a transmission from the ESL AP 604 (e.g., the beacon start transmission), a transmission from the ESL controller 606 (e.g., such as a beacon), or a signal from an energizer device. In some implementations, the IoT tags may transmit responses in a TDMA fashion, similar to the operations of FIG. 3.

At 625, the ESL controller 606 receives the first beacon and measures the beacon. For example, the ESL controller 606 measures a RSSI of the first beacon. The ESL controller 606 may generate measurement information based on performing one or more measurement operations on the received beacon.

At 630, the ESL controller 606 determines a second position for the IoT tag 608 based on beacon measurement information. For example, the ESL controller 606 determines a first position of the IoT tag 608 based on the first measurement information (e.g., RSSI). In some implementations, the ESL controller 606 determines the first position of the IoT tag 608 based on the first measurement information and the initial position information.

At 635, the ESL controller 606 transmits the second position for the IoT tag 608 to the ESL server 602. For example, the ESL controller 606 transmits the second position for the IoT tag 608 to the ESL server 602 via the ESL AP 604.

At 640, the IoT tags transmit second beacons. For example, the IoT tag 608 transmits a second beacon. To illustrate, the IoT tag 608 broadcasts the second beacon based on the received RF energy or second received RF energy. The RF energy may be harvested from the transmission from the ESL AP 604 (e.g., the beacon start transmission), the transmission from the ESL controller 606 (e.g., such as the beacon), or the signal from the energizer device, or from a second transmission from the ESL AP 604, a second transmission from the ESL controller 606 (e.g., such as a second beacon), or a second signal from the energizer device.

At 645, the ESL controller 606 receives the second beacon and measures the second beacon. For example, the ESL controller 606 measures a second RSSI of the second beacon. The ESL controller 606 may generate second measurement information based on performing one or more second measurement operations on the received second beacon. Additionally, or alternatively, the measurement information may include RSRP, AoA, or both.

At 650, the ESL controller 606 determines a third position for the IoT tag 608 based on beacon measurement information. For example, the ESL controller 606 determines a third position of the IoT tag 608 based on the second measurement information (e.g., second RSSI). In some implementations, the ESL controller 606 determines the third position of the IoT tag 608 based on the second measurement information and one or more of the first measurement information or the initial position information.

At 655, the ESL controller 606 transmits the third position for the IoT tag 608 to the ESL server 602. For example, the ESL controller 606 transmits the third position for the IoT tag 608 to the ESL server 602 via the ESL AP 604.

At 660, the ESL system determines a notification based on the position information. For example, the ESL system determines a notification indicating a change in position based on multiple positions.

At 665, the ESL system transmits a notification based on the position information. For example, the ESL system transmits a notification indicating a change in position based on multiple positions.

Figure 7:
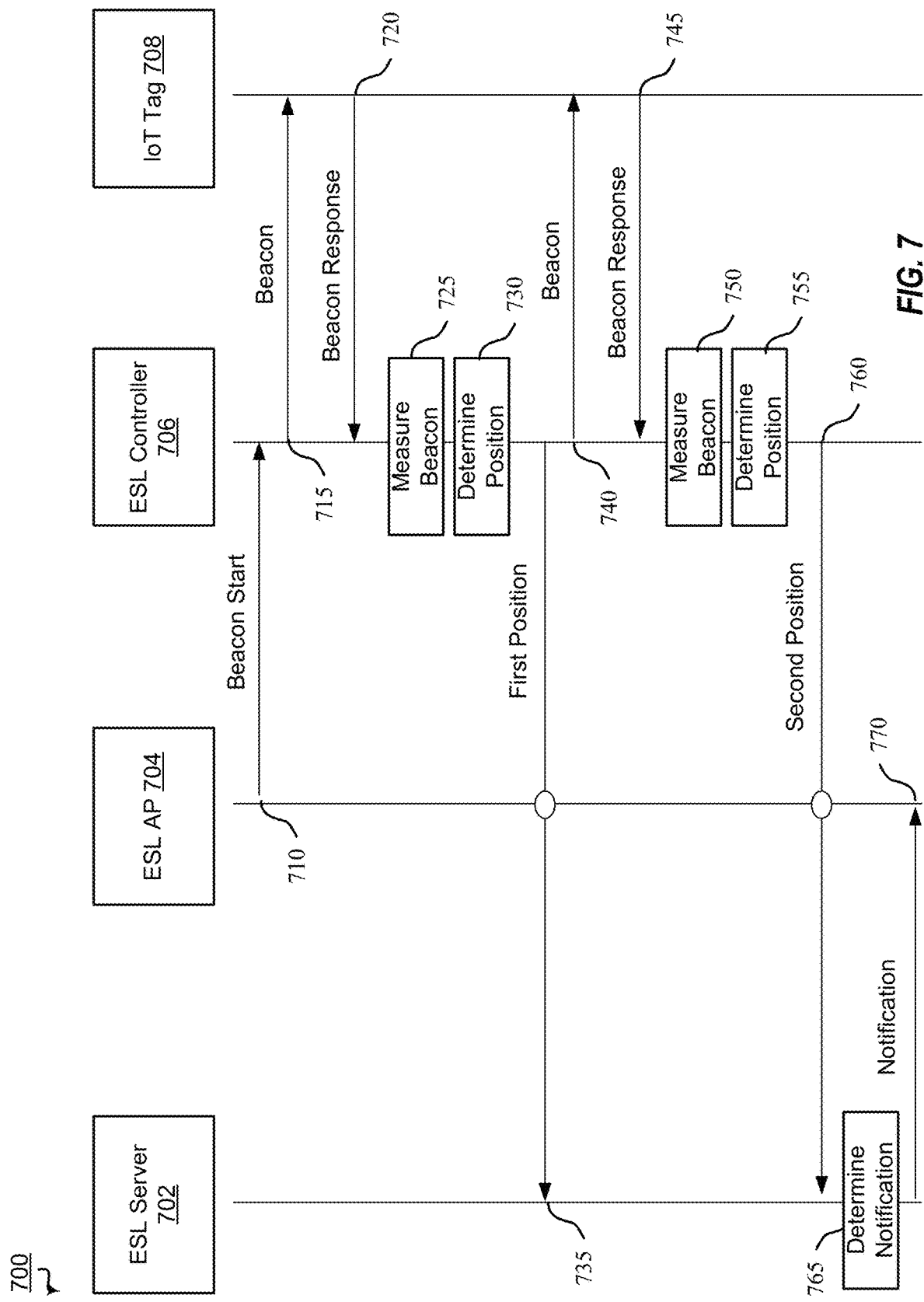
FIG. 7 is a timing diagram illustrating an example process that supports enhanced ESL position determination and ESL position based notifications according to one or more aspects.

Referring to FIG. 7, FIG. 7 is a timing diagram 700 illustrating an ESL system that supports enhanced position determination and position based notifications according to one or more aspects. The example of FIG. 7 corresponds to an example of downlink position determination by an ESL device, similar to the uplink position determination operations in FIG. 6, but where the position is determined based on beacon responses from IoT tags, where the beacon responses are triggered by an ESL device. The example FIG. 7 may enable determination of ESL based positions by one or more ESL infrastructure devices.

In the example of FIG. 7, the ESL system includes an ESL server 702, an ESL AP 704, an ESL controller 706, and an IoT tag 708. The ESL controller 706 may include or correspond to an ESL with a wireless radio or a wireless device/radio associated with a plurality of ESLs.

Prior to 710, the ESL system may establish initial positions of one or more devices of the ESL system, one or more assets of the ESL system, or both, such as similar to described with reference to FIG. 6.

At 710, the ESL AP 704 may initiate beacon transmissions by ESL devices. For example, the ESL AP 704 may transmit a beacon start transmission, such as the broadcast transmission at 302 of FIG. 3, and similar to as described with reference to 615 of FIG. 6. To illustrate, the ESL AP 704 may broadcast a transmission which is configured to cause ESL controllers, including ESL controller 706, to transmit beacon transmissions, cause IoT tags to transmit beacon transmissions, or both. The beacon start message may include or correspond to a configuration transmission.

At 715, the ESL controllers transmit beacons. For example, the ESL controller 706 transmits a first beacon to prompt a response by associated assets and IoT tags, for measurement by ESL system devices (e.g., UEs, employees, robots) and/or external devices (e.g., UEs, shoppers), or a combination thereof. To illustrate, the ESL controller 706 broadcasts the first beacon in response to the beacon start transmission to solicit a response from IoT tags for measurement and position determination.

At 720, the IoT tags transmit beacons. For example, the IoT tag 708 transmits a first beacon response. To illustrate, the IoT tag 708 broadcasts the first beacon based on received RF energy. The RF energy may be harvested from a transmission from the ESL AP 604 (e.g., the beacon start transmission), a transmission from the ESL controller 706 (e.g., such as the beacon), or a signal from an energizer device. In some implementations, the IoT tags may transmit responses in a TDMA fashion, similar to the operations of FIG. 3.

At 725, the ESL controller 706 receives the first beacon response and measures the first beacon response. For example, the ESL controller 706 measures a RSSI of the first beacon response. The ESL controller 706 may generate measurement information based on performing one or more measurement operations on the received beacon response.

At 730, the ESL controller 706 determines a second position for the IoT tag 608 based on beacon measurement information. For example, the ESL controller 606 determines a first position of the IoT tag 708 based on the first measurement information (e.g., RSSI). In some implementations, the ESL controller 706 determines the first position of the IoT tag 608 based on the first measurement information and the initial position information.

At 735, the ESL controller 706 transmits the first position for the IoT tag 708 to the ESL server 702. For example, the ESL controller 706 transmits the second position for the IoT tag 708 to the ESL server 702 via the ESL AP 704.

At 740, the ESL controllers transmit beacons. For example, the ESL controller 706 transmits a second beacon to prompt a response by associated assets and IoT tags, for measurement by ESL system devices (e.g., UEs, employees, robots) and/or external devices (e.g., UEs, shoppers), or a combination thereof. To illustrate, the ESL controller 706 broadcasts the second beacon in response to the beacon start transmission or a second beacon start transmission to solicit a response from IT tags for measurement and position determination.

At 745, the IoT tags transmit second beacon responses. For example, the IoT tag 708 transmits a second beacon response in response to the second beacon. To illustrate, the IoT tag 708 broadcasts the second beacon response based on the received RF energy or second received RF energy. The RF energy may be harvested from the transmission from the ESL AP 704 (e.g., the beacon start transmission), the transmission from the ESL controller 706 (e.g., such as the beacon), or the signal from the energizer device, or from a second transmission from the ESL AP 704, a second transmission from the ESL controller 706 (e.g., such as the second beacon), or a second signal from the energizer device.

At 750, the ESL controller 706 receives the second beacon response and measures the second beacon response. For example, the ESL controller 706 measures a second RSSI of the second beacon response. The ESL controller 706 may generate second measurement information based on performing one or more second measurement operations on the received second beacon response.

At 755, the ESL controller 706 determines a second position for the IoT tag 708 based on beacon response measurement information. For example, the ESL controller 706 determines a second position of the IoT tag 708 based on the second measurement information (e.g., second RSSI). In some implementations, the ESL controller 706 determines the second position of the IoT tag 708 based on the second measurement information and one or more of the first measurement information or the initial position information.

At 760, the ESL controller 706 transmits the second position for the IoT tag 708 to the ESL server 702. For example, the ESL controller 706 transmits the second position for the IoT tag 708 to the ESL server 702 via the ESL AP 704.

At 765, the ESL system determines a notification based on the position information. For example, the ESL system determines a notification indicating a change in position based on multiple positions.

At 770, the ESL system transmits a notification based on the position information. For example, the ESL system transmits a notification indicating a change in position based on multiple positions.

Figure 8:
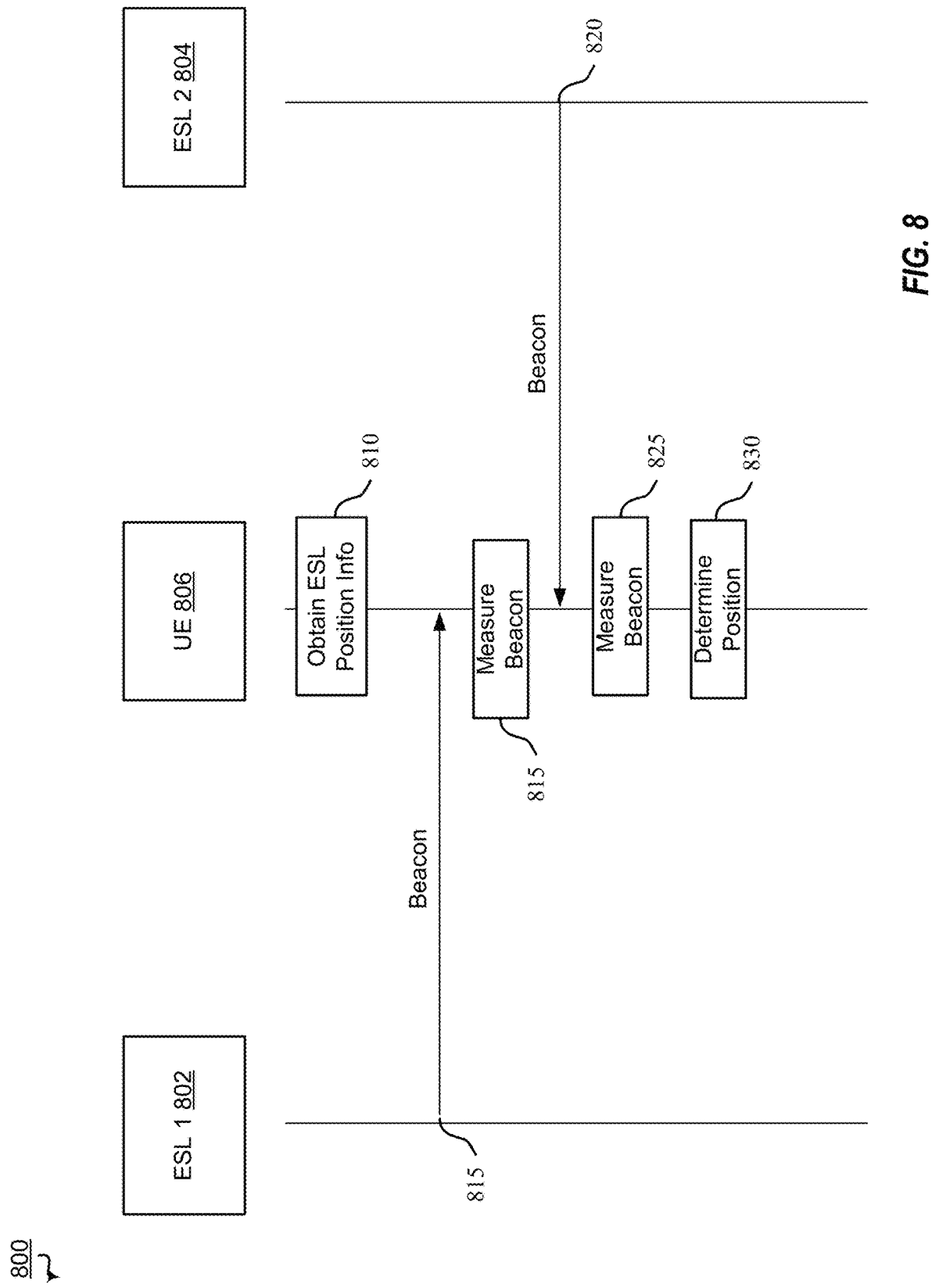
FIG. 8 is a timing diagram illustrating an example process that supports enhanced ESL position determination and ESL position based notifications according to one or more aspects.

Referring to FIG. 8, FIG. 8 is a timing diagram 800 illustrating an ESL system that supports enhanced position determination and position based notifications according to one or more aspects. The example of FIG. 8 corresponds to an example of downlink position determination by a UE, similar to the operations in FIG. 7, but where the position is determined by a UE associated with or separate from the ESL system. The example FIG. 8 may enable determination of ESL based positions by devices outside of the ESL infrastructure.

In the example of FIG. 8, the ESL system includes a plurality of ESLs, a first ESL 802 and a second ESL 804, and a UE 806. Each ESL may include or correspond to an ESL controller or an ESL AP of FIGS. 6 and 7. The UE 806 may include or correspond to an ESL system UE or device (e.g., employee UE, robot UE, barcode scanner, etc.) or to a non-ESL system UE or device (e.g., a shopper or customer UE).

At 810, the ESL system may establish initial positions of one or more devices of the ESL system, one or more assets of the ESL system, or both, such as similar to described with reference to FIGS. 6 and 7. For example, the ESL system may establish initial position information based on preconfigured positions relative to other devices, based on initial position information associated with ESL infrastructure installation or reconfiguration, etc. The initial position may be provided to ESL devices of the ESL system, and/or to UEs which interact with the ESL system. Additionally, or alternatively, the ESL system may determine subsequent positions based on the initial position information and provide the subsequent positions to the ESL devices of the ESL system, and/or to the UEs which interact with the ESL system. The positions determined by the ESL system may be absolution positions and indicate positions of devices or objects relative to a coordinate system, or may be relative positions and indicate a position of one device or object relative to one or more other devices or objects.

As compared to position determination by a device or ESL device of the ESL infrastructure, as illustrated in FIGS. 6 and 7 which already have location/position information for the other ESL devices, position determination by a device outside of the ESL infrastructure may obtain ESL position/location information indicating locations/positions of ESL devices to enable ESL based position determination.

At 815, the first ESL 802 transmits a first beacon. For example, the first ESL 802 transmits a first beacon for measurement by ESL system devices (e.g., UEs, employees, robots, etc.) and/or external devices (e.g., UEs, shoppers, etc.), or a combination thereof. To illustrate, the first ESL 802 broadcasts the first beacon in response to a beacon start transmission or a position determination transmission, such as described with reference to 715 of FIG. 7.

At 820, the UE 806 receives the first beacon and measures the first beacon. For example, the UE 806 measures a RSSI of the first beacon. The UE 806 may generate measurement information based on performing one or more measurement operations on the received first beacon. In other implementations, the UE 806 may determine other measurements in addition to or the alternative of RSSI, such as RSRP and/or AoA as illustrative, non-limiting examples. Additionally, or alternatively, the first beacon may indicate a position of the first ESL 802. For example, the first beacon transmitted by the first ESL 802 may include ID information indicating the first ESL 802 and first location information indicating a first location of the first ESL 802 (e.g., a location of a radio of or associated with the first ESL 802).

Although not shown in the example of FIG. 8, the UE 806 may determine a position of the UE 806 based on the first beacon and first measurement information. For example, the UE 806 may determine a first or initial position based on the location of the first ESL 802 and based on the RSSI of the first beacon. As described above, the location of the first ESL 802 may be provided in the first beacon, or may be provided by the ESL system, such as from an ESL server or ESL AP, such as described with reference to FIGS. 6 and 7.

At 825, the second ESL 804 transmits a second beacon. For example, the second ESL 804 transmits a second beacon for measurement by ESL system devices (e.g., UEs, employees, robots, etc.) and/or external devices (e.g., UEs, shoppers, etc.), or a combination thereof. To illustrate, the second ESL 804 broadcasts the second beacon in response to a beacon start transmission or a position determination transmission, such as described with reference to 715 of FIG. 7.

At 830, the UE 806 receives the second beacon and measures the second beacon. For example, the UE 806 measures a RSSI of the second beacon. The UE 806 may generate second measurement information based on performing one or more measurement operations on the received second beacon. In other implementations, the UE 806 may determine other measurements in addition to or the alternative of RSSI, such as RSRP and/or AoA as illustrative, non-limiting examples. Additionally, or alternatively, the second beacon may indicate a position of the second ESL 804. For example, the second beacon transmitted by the second ESL 804 may include second ID information indicating the second ESL 804 and second location information indicating a location of the second ESL 804 (e.g., a location of a radio of or associated with the second ESL 804).

At 835, the UE 806 determines a position of itself based on beacon measurement information. For example, the UE 806 determines a position of the UE 806 based on the first measurement information (e.g., first RSSI) and the second measurement information (e.g., second RSSI), and optionally position information of one or more ESL devices or itself. To illustrate, the UE 806 may determine the position based on a weighted average of the RSSIs of received beacons. Although two beacons are illustrated in the example of FIG. 8 for simplicity, the UE 806 may receive many beacons and determine many measurements. For example, the UE 806 may receive beacons from multiple additional ESLs, from other types of devices, such as ESL APs, other UEs, IoT tags, etc., or a combination thereof.

In some implementations, the UE 806 determines the position based further on positions of the ESL devices, a previous position of the UE 806, or both. The previous position/location of the ESL devices may be indicated by location information of beacons from the ESL devices, or based on a location information provided to the UE 806 via separate signaling from the ESL server or ESL AP. The previous position of the UE 806 may be a previous position calculated based on the ESL system or information thereof, or a previous position calculated by another method (e.g., GPS position). For example, the position of the UE 806 may be determined based on a weighted average of positions of all the ESLs from which the UE 806 received a beacon, where the RSSI values of the beacons are used to determine the weights for the respective positions of the beacons. Thus, the UE 806 may determine that it is closer to ESLs or other devices for which it received stronger beacons from.

Figure 9:
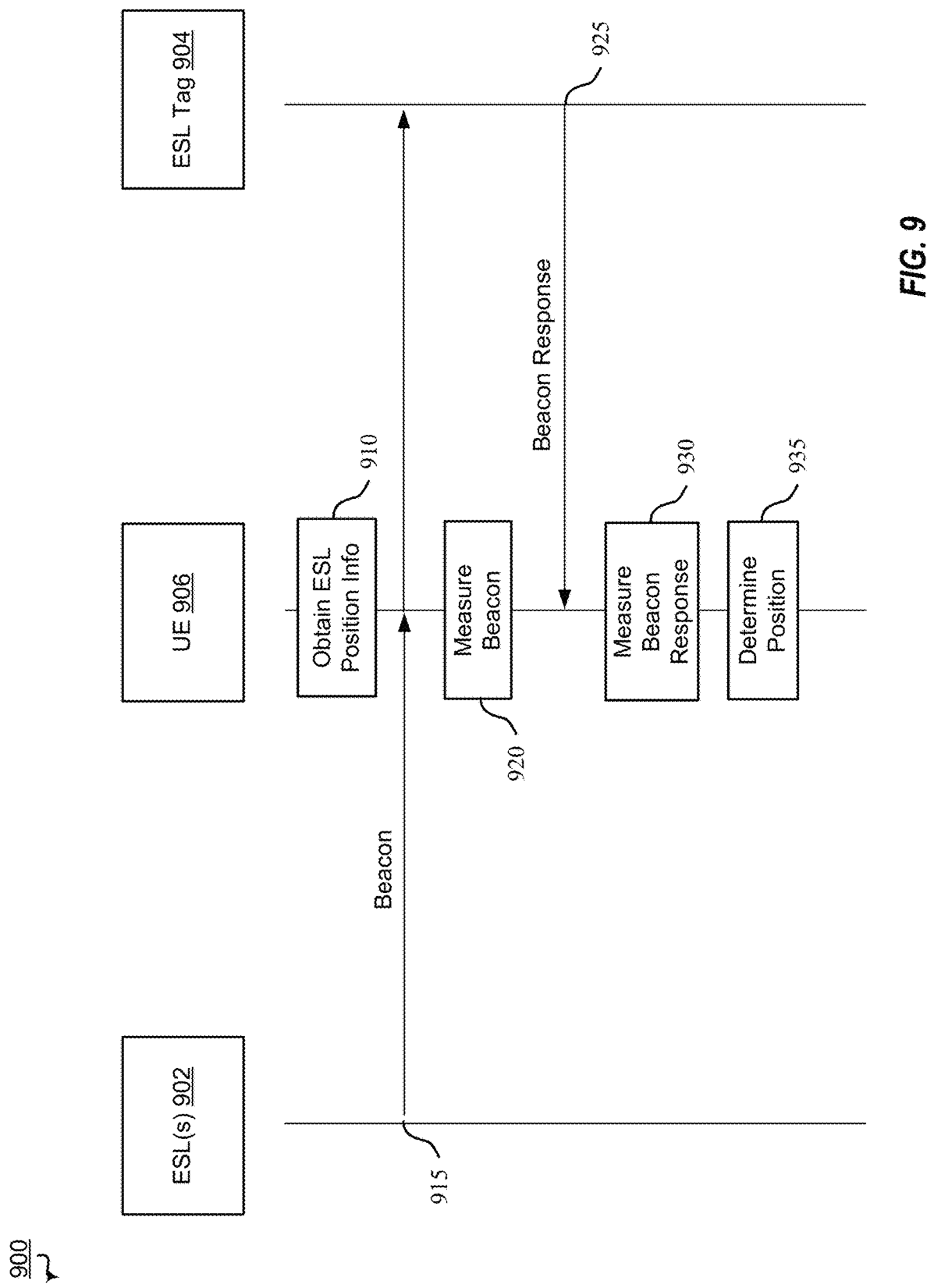
FIG. 9 is a timing diagram illustrating an example process that supports enhanced ESL position determination and ESL position based notifications according to one or more aspects.

Referring to FIG. 9, FIG. 9 is a timing diagram 900 illustrating an ESL system that supports enhanced position determination and position based notifications according to one or more aspects. The example of FIG. 9 corresponds to an example of downlink and/or uplink position determination by a UE, similar to the operations in FIG. 8, but where the position is further determined based on signals or beacons from ESL or IoT tags, such as a beacon response.

In the example, of FIG. 9, the ESL system includes a plurality of ESLs, such as a first ESL 902, a plurality of ESL or IoT tags, such as an ESL tag 904, and a UE 906. Each ESL may include or correspond to an ESL controller or an ESL AP of FIGS. 6 and 7 or an ESL of FIG. 8. Each ESL tag may include or correspond to an ESL tag, such as ESL tag 593 of FIG. 5 and may be associated with (e.g., coupled to) a product or asset of the ESL system. The UE 906 may include or correspond to an ESL system UE or device (e.g., employee UE, robot UE, barcode scanner, etc.) or to a non-ESL system UE or device (e.g., a shopper or customer UE), such as UE 806 of FIG. 8.

At 910, the ESL system may establish initial positions of one or more devices of the ESL system, one or more assets of the ESL system, or both, such as similar to described with reference to FIGS. 6-8.

At 915, the first ESL 902 transmits a first beacon. For example, the first ESL 902 transmits a first beacon for measurement by ESL system devices (e.g., UEs, employees, robots, etc.) and/or external devices (e.g., UEs, shoppers, etc.), or a combination thereof. To illustrate, the first ESL 902 broadcasts the first beacon in response to a beacon start transmission or a position determination transmission, such as described with reference to 715 of FIG. 7.

At 920, the UE 906 receives the first beacon and measures the first beacon. For example, the UE 906 measures a RSSI of the first beacon. The UE 906 may generate measurement information based on performing one or more measurement operations on the received first beacon.

At 925, the ESL tag 904 transmits a second beacon. For example, the ESL tag 904 transmits a second beacon for measurement by ESL system devices (e.g., UEs, employees, robots) and/or external devices (e.g., UEs, shoppers), or a combination thereof. To illustrate, the ESL tag 904 broadcasts the second beacon in response to a beacon start transmission or a position determination transmission, such as described with reference to 715 of FIG. 7 or 825 of FIG. 8. As compared to the first beacon from the ESL 902, the second beacon from the ESL tag 904 may not indicate position information of the ESL tag 904 as the ESL tag 904 may be moveable within an area of the ESL system.

At 930, the UE 906 receives the second beacon and measures the second beacon. For example, the UE 906 measures a RSSI of the second beacon. The UE 906 may generate second measurement information based on performing one or more measurement operations on the received second beacon.

At 935, the UE 906 determines a position of itself based on beacon measurement information. For example, the UE 906 determines a position of the UE 906 based on the first measurement information (e.g., first RSSI) and the second measurement information (e.g., second RSSI), such as described with reference to 835 of FIG. 8. To illustrate, the UE 906 may determine the position based on a weighted average of the RSSIs of received beacons. Although two beacons are illustrated in the example of FIG. 9 for simplicity, the UE 906 may receive many beacons and determine many measurements to determine the position.

Figure 10:
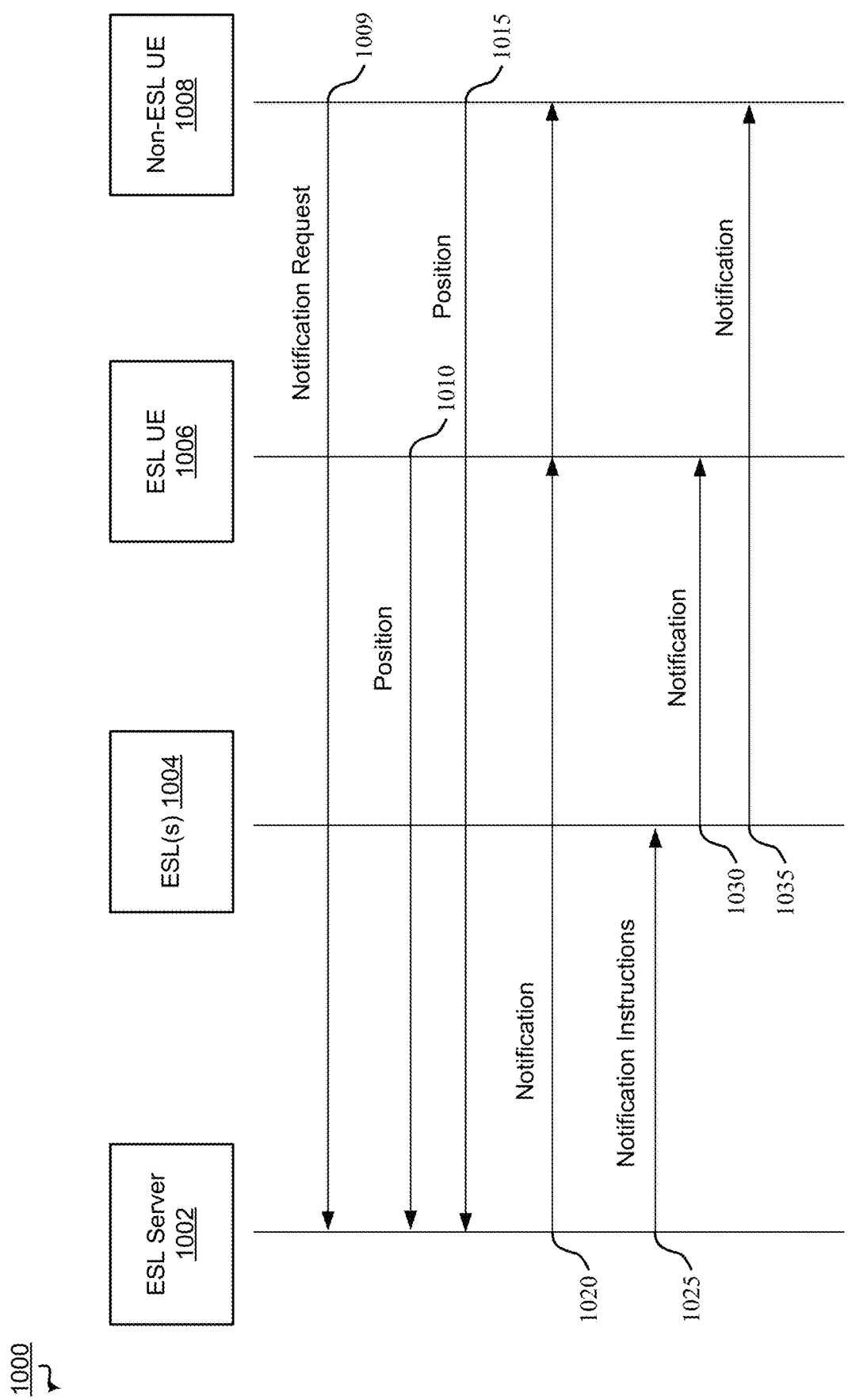
FIG. 10 is a timing diagram illustrating an example process that supports enhanced ESL position determination and ESL position based notifications according to one or more aspects.

Referring to FIG. 10, FIG. 10 is a timing diagram 1000 illustrating an ESL system that supports enhanced position determination and position based notifications according to one or more aspects. The example of FIG. 10 corresponds to an example of position notifications for a UE. The example FIG. 10 may enable the ESL system to provide notifications, determined based on ESL determined positions, to devices outside of the ESL infrastructure.

The notifications in FIG. 10 may be generated in combination with the notification of 556, such as after or accompanying the notification 556. Alternatively, the notifications of FIG. 10 may be used independent of the notification 556 and in alternative to the notification 556.

In the example of FIG. 10, the ESL system includes an ESL server 1002, an ESL 1004, an ESL UE 1006 (e.g., employee or robot), and a non-ESL UE 1008 (e.g., shopper or customer). The ESL server 1002 may include or correspond to the ESL device 505, the ESL server 602, or the ESL server 702. In some implementations, the system may include an ESL AP, such as described with reference to FIGS. 6 and 7. The ESL AP may perform one or more actions of the ESL server 1002, and/or may provide or relay transmissions between the ESL server 1002 and the ESLs, such as ESL 1004. The ESL 1004 may include or correspond to an ESL with a wireless radio or a wireless device/radio associated with a plurality of ESLs.

The ESL UE 1006 may include or correspond to an ESL system UE or device (e.g., employee UE, robot UE, barcode scanner, etc.), and the non-ESL UE 1008 may include or correspond to a non-ESL system UE or device (e.g., a shopper or customer UE). Both ESL UE 1006 and non-ESL UE 1008 may include or correspond to UE 115, UE 806, or UE 906.

At 1009, the ESL server 1002 optionally receives a notification request from the ESL UE 1006 or the non-ESL UE 1008. For example, the ESL server 1002 receives a request for a notification of a status of ESL infrastructure or inventory from the ESL UE 1006, or receives a request for a notification of a position or direction to ESL infrastructure or inventory from the non-ESL UE 1008.

At 1010, the ESL server 1002 obtains position information of the ESL UE 1006. The ESL server 1002 may obtain a position of the ESL UE 1006 based on an ESL determined position as described with reference to FIGS. 5 and 8. For example, the ESL UE 1006 transmits position information to the ESL server 1002 determined based on beacons from ESL infrastructure. As another example, the ESL server 1002 calculates a position of the ESL UE 1006 based on beacons from the ESL UE 1006 received by ESL infrastructure.

At 1015, the ESL server 1002 obtains position information of the non-ESL UE 1008. The ESL server 1002 may obtain a position of the non-ESL UE 1008 based on an ESL determined position as described with reference to FIGS. 5 and 8. For example, the non-ESL UE 1008 transmits position information to the ESL server 1002 determined based on beacons from ESL infrastructure. As another example, the ESL server 1002 calculates a position of the non-ESL UE 1008 based on beacons from the non-ESL UE 1008 received by ESL infrastructure.

At 1020, the ESL server 1002 transmits a notification to the ESL UE 1006, the non-ESL UE 1008, or both. For example, the ESL server 1002 transmits a notification similar to the notification 556 of FIG. 5.

At 1025, the ESL server 1002 transmits notification instruction information to one or more ESLs. For example, the ESL server 1002 transmits notification instructions to one or more ESLs configured to cause the ESLs to provide a visual or audio output to or for one or more of the UEs.

At 1030, the one or more ESLs provide notifications to the ESL UE 1006. For example, at least one ESL of the one or more ESLs outputs a notification to the ESL UE 1006 based on the notification instruction information. To illustrate, the ESL 1004 outputs visual and/or audio notifications to the ESL UE 1006, as described further with reference to FIG. 11B.

At 1035, the one or more ESLs provide notifications to the non-ESL UE 1008. For example, at least one ESL of the one or more ESLs outputs a notification to the ESL UE 1006 based on the notification instruction information. To illustrate, the ESL 1004 outputs visual and/or audio notifications to the non-ESL UE 1008, as described further with reference to FIG. 11A.

Referring to FIGS. 11A and 11B, FIGS. 11A and 11B are diagrams illustrating an ESL system that supports enhanced position based notifications according to one or more aspects. The example of FIG. 11A corresponds to an example of position notifications for a non-ESL UE and the example of FIG. 11B corresponds to an example of position notifications for an ESL UE.

Referring to FIG. 11A, FIG. 11A is a diagram 1100 illustrating examples of ESL system notifications for a non-ESL UE, including notifications output via ESLs. The ESLs may include visual and audio output devices, such as described with reference to FIG. 4, and be configured to provide audio and/or visual outputs to direct a UE or person to a particular asset or ESL.

The examples of FIG. 11A may enable the ESL system to provide notifications based on of ESL determined positions to devices outside of the ESL infrastructure using I/O devices of one or more ESLs.

The notifications in FIG. 11A may be generated in combination with the notification of 556, such as after or accompanying the notification 556. Alternatively, the notifications of FIG. 11A may be used independent of the notification 556.

As one illustrative example, the ESL system may provide visual notifications to a UE and provide notification information (e.g., notification instructions) to one or more ESLs to light up a particular color or display a particular message for the UE. The display of the ESL may change colors, a LED notification light may change colors, or both. For example, an ESL or group of ESLs may turn green and/or flash. Additionally, or alternatively, other nearby ESLs may turn another color, such as red. As another illustration, multiple groups of ESLs may flash in a coordination with one other. For example, sets of ESLs may flash or change color in sequence to provide or illuminate a path for the customer or UE. The notification may change based on a position updated from the UE, such as the UE passes by sets of ESLs and provides position updates.

Additionally, or alternatively, the ESL system may provide audio notifications to a UE and provide notification information (e.g., notification instructions) to one or more ESLs to produce a sound. The speaker of one or more ESLs may output one or more sounds or signals to direct a UE to the ESL or product (e.g., position of IoT tag associated with an asset and determined by the ESL system). The speaker may output a chime, a buzz, a ring, words (e.g., instructions, such as left, end of aisle, top shelf, look down, etc.), etc. The type of sound may change based on changes in the position of the UE. For example, the sound output level or pitch may be increased as the UE gets closer.

In addition, the ESL system may provide notification via the UE in addition to or in the alternative of audio and/or visual notification/information. For example, the ESL system may send one or more notifications to the UE to provide haptic feedback via the UE. As other examples, the ESL system may send one or more notifications to the UE to provide audio or visual outputs via the UE.

Referring to FIG. 11B, FIG. 11B is a diagram 1150 illustrating examples of ESL system notifications for an ESL UE, including notifications output via ESLs. The ESLs may include visual and audio output devices, such as described with reference to FIG. 4, and be configured to provide audio and/or visual outputs to direct a UE or person to a particular asset or ESL.

The examples of FIG. 11B may enable the ESL system to provide notifications based on ESL determined positions to devices outside of the ESL infrastructure, but associated with the ESL system, using I/O devices of one or more ESLs.

The notifications in FIG. 11B may be generated in combination with the notification of 556, such as after or accompanying the notification 556. Alternatively, the notifications of FIG. 11B may used independent of the notification 556.

In some implementations, the ESL system is configured to only provide notifications to the ESL UE for ESL and/or assets with a range (proximity) of the ESL UE. To illustrate, a worker may be moving through the store and get notifications for nearby ESLs and assets (IoT tags). The notifications may be determined as the ESL UE moves through the store, or may have been previously determined and pushed to the ESL UE based on the ESLs position. The ESL UE, worker or robot, may get any of the notifications described with reference to FIG. 11A, such as notifications via the ESL UE or via one or more ESLs.

In some implementations, the ESL system may be configured to filter out notifications within a range of an ESL UE. For example, the ESL UE, a worker or a robot, may be restocking items or performing another task which may trigger notifications. The ESL system may be configured to deactivate notifications for this area, filter out notifications for this area, or temporarily pause the determination of notifications for this area, such as pause beacon transmissions in the area.

In some implementations, the ESL UE may determine position updates and/or notifications for the ESLs, IoT tags, or both. For example, the ESL UE may determine its position and positions of other IoT tags to determine one or more notifications, such as asset found, asset moved, asset running low/restock, asset misplaced, etc. In some such implementations, the ESL UE may be configured to power the IoT tags and include an energizer or other device configured to wirelessly power the IoT tags.

In some implementations, where the UE is a robot, the robot may utilize ESL notifications for fine guidance. To illustrate, the robot may utilize other methods of positioning for gross or coarse location information, and then may supplement such location information with ESL position information. As another illustration, the robot may utilize other methods of positioning for gross or coarse location information, and then may utilize ESL positioning for fine positioning, such as to grab or lift an object. The ESLs may output video or audio signals or instructions for guiding the robot to the ESL or asset. Similar to outputs for other types of UEs and people, colors and/or sounds may be used to guide a robot on how far to place a fork of a forklift, or perform other automated tasks.

Referring to FIG. 11C, FIG. 11C is a diagram 1190 illustrating an example formula for enhanced ESL position determination according to one or more aspects. In the example of FIG. 11C, measurement information, such as RSSI, of signals from a plurality of transmitting devices is used to determine a position of the receiving device. Generally, positions of the transmitting device are weighted based on RSSI, with higher RSSIs associated with higher weighting values to determine a position of the receiving device. In some implementations, this position determination may be adjusted or modified by one or more other measurements of the received signals, such as RSRP, AoA, and/or one or more other types of measurements, such as GPS, Wi-Fi, etc.

In the equation of FIG. 11C, the estimated position is equal to a sum of a function of the weights of all the signals multiplied by a corresponding position of the transmitter of the signals, divided by a sum of a function of the weights of all the signals. The weight value for a particular signal/transmitter may be determined based on a value of 2 to the power of a quotient of a dividend of a difference of the RSSI of the signal/transmitter minus a lowest received RSSI value divided by a divisor of a priority level (lambda). N may include or correspond to a maximum number of nodes or anchor nodes, or a number of received signals.

Figures 12, 13:
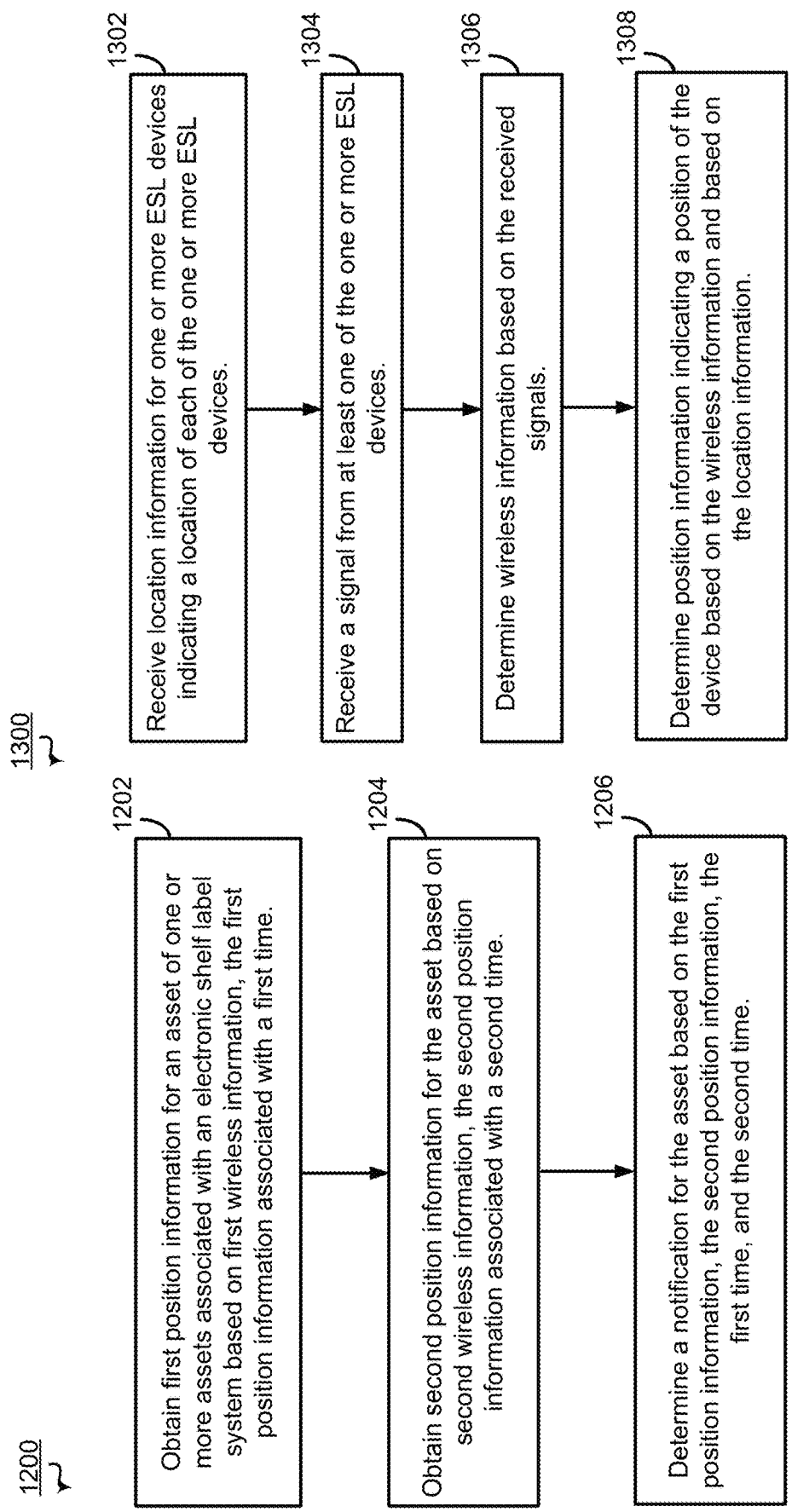
FIG. 12 is a flow diagram illustrating an example process that supports enhanced ESL position determination and ESL position based notifications according to one or more aspects.
FIG. 13 is a flow diagram illustrating an example process that supports enhanced ESL position determination and ESL position based notifications according to one or more aspects.
Figure 17:
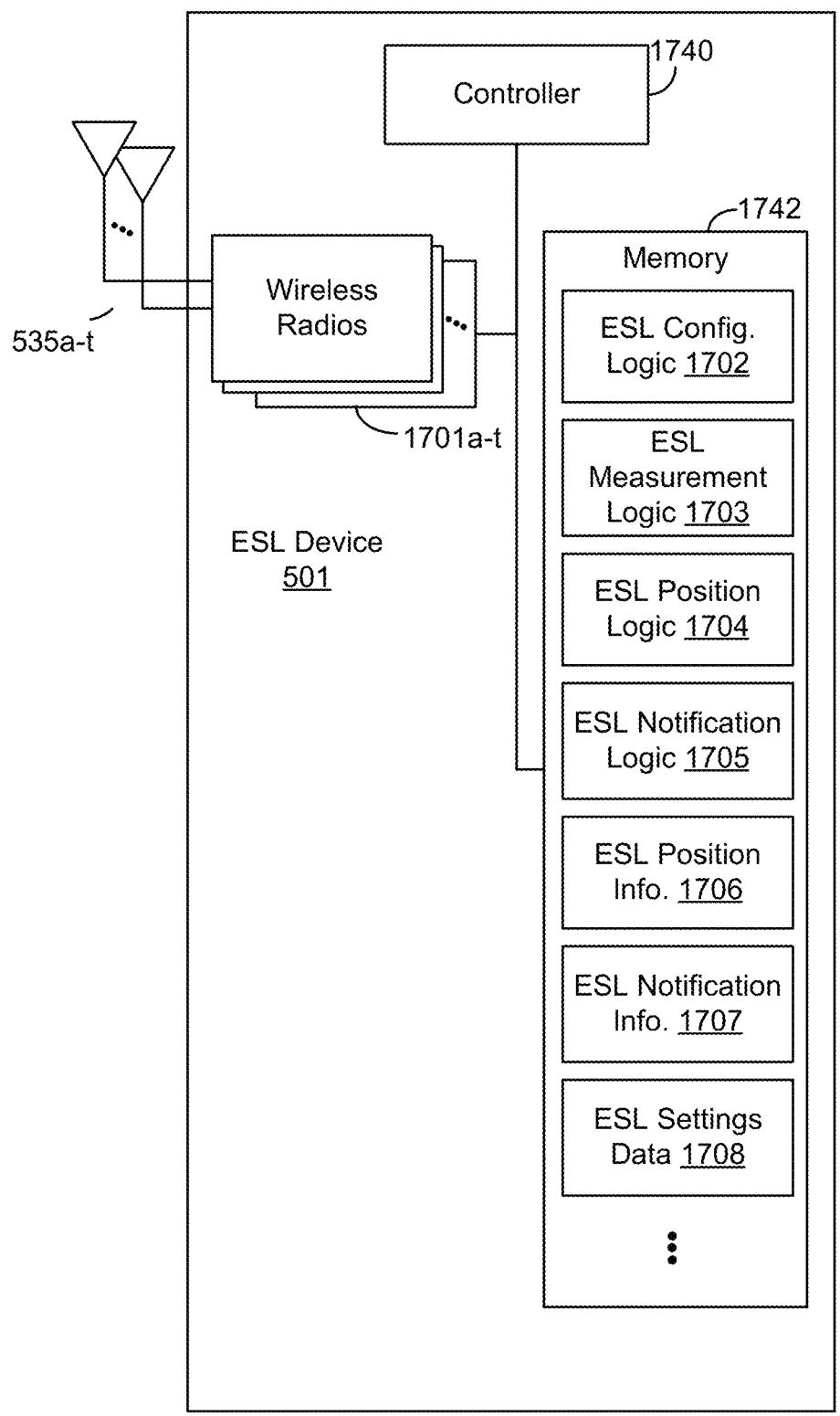
FIG. 17 is a block diagram of an example ESL device that supports enhanced ESL position determination and ESL position based notifications according to one or more aspects.

FIG. 12 is a flow diagram 1200 illustrating example blocks executed by wireless communication device (e.g., an ESL device or a UE) configured according to an aspect of the present disclosure. The example blocks will also be described with respect to ESL device 501 as illustrated in FIG. 17. FIG. 17 is a block diagram illustrating ESL device 501 configured according to one aspect of the present disclosure. ESL device 501 includes the structure, hardware, and components as illustrated for ESL device 501 of any of FIG. 5. For example, ESL device 501 includes controller/processor 1740, which operates to execute logic or computer instructions stored in memory 1742, as well as controlling the components of ESL device 501 that provide the features and functionality of ESL device 501. ESL device 501, under control of controller/processor 240, transmits and receives signals via wireless radios 1701a-t and antennas 535a-t. As illustrated in the example of FIG. 17, memory 1742 stores one or more of ESL configuration logic 1702, ESL measurement logic 1703, ESL position logic 1704, ESL notification logic 1705, ESL position information 1706, ESL notification information 1707, or ESL settings data 1708. The data (1702-1708) stored in the memory 242 may include or correspond to data and/or logic to enable the operations of FIGS. 5-10.

At block 1202, a wireless communication device, such as an ESL device 501 or a UE, obtains first position information for an asset of one or more assets associated with an electronic shelf label system based on first wireless information, the first position information associated with a first time. The first position information may include or correspond to initial/original position information or location information which is preconfigured, entered manually, determined by a positioning process or UE, determined by an ERP systems, etc. The first position information may include or correspond to the first position information 552 or any of the determined positions of FIGS. 6-10. For example, the ESL device 501 determines the first position information 552 of the wireless device 503 of FIG. 5. The ESL device 501 may determine the first position information as described with reference to any of the examples of FIGS. 6-10. As another example, the ESL device 501 receives the first position 452 from the wireless device 503 of FIG. 5, which was calculated by the wireless device 503.

At block 1204, the wireless communication device obtains second position information for the asset based on second wireless information, the second position information associated with a second time. The second position information may include or correspond to the second position 554 or any of the determined positions of FIGS. 6-10. For example, the ESL device 501 determines the first position 452 of the wireless device 503 of FIG. 5. The ESL device 501 may determine the second position information as described with reference to any of the examples of FIGS.

6-10. As another example, the ESL device 501 receives the second position 554 from the wireless device 503 of FIG. 5, which was calculated by the wireless device 503.

At block 1206, the wireless communication device determines a notification for the asset based on the first position information, the second position information, the first time, and the second time. The notification may include or correspond to the notification 556 of FIG. 5 or any of the notifications of FIG. 6, 7, or 10. For example, the ESL device 501 may determine a notification based on the first position information 552, the second position information 554, the first time, and the second time.

The wireless communication device (e.g., UE or ESL device) may execute additional blocks (or the wireless communication device may be configured further to perform additional operations) in other implementations. For example, the wireless communication device, such as one or more processors and one or more memories (e.g., a processing system) thereof, may perform one or more operations described above, such as described with reference to FIGS. 5-11C. As another example, the wireless communication device may perform one or more aspects as presented below.

In a first aspect, the at least one processor is further configured to cause the device to obtain the first position information includes to: receive the first position information from an ESL device; perform uplink position determination based on uplink wireless information from one or more ESL devices to obtain the first position information; or perform downlink position determination based on downlink wireless information from one or more ESL devices to obtain the first position information.

In a second aspect, alone or in combination with the first aspect, the at least one processor configured to cause the device to obtain the second position information includes to: perform an uplink position determination to obtain the second position information; or perform a downlink position determination to obtain the second position information.

In a third aspect, alone or in combination with one or more of the above aspects, the at least one processor configured to cause the device to perform the downlink position determination include to: transmit a beacon; receive a response to the beacon from the asset; calculate one or more of a received signal strength indicator (RSSI), a reference signal received power (RSRP), or an angle-of-arrival (AoA), of the response; and determine the second position information based on one or more of the RSSI, the RSRP, or the AoA of the response to the beacon.

In a fourth aspect, alone or in combination with one or more of the above aspects, the at least one processor configured to cause the device to perform the uplink position determination include to: receive a beacon from the asset; calculate one or more of a received signal strength indicator (RSSI), a reference signal received power (RSRP), or an angle-of-arrival (AoA), of the beacon; and determine the second position information based on one or more of the RSSI, the RSRP, or the AoA of the beacon.

In a fifth aspect, alone or in combination with one or more of the above aspects, the notification comprises an asset moved notification, an asset misplaced notification, an asset stolen notification, or an asset not responding notification, and wherein the at least one processor is further configured to cause the device to: transmit a notification message indicating the notification.

In a sixth aspect, alone or in combination with one or more of the above aspects, the notification is an asset moved notification, wherein a first position indicated by the first position information corresponds to an initial position or an in-stock position, and wherein a second position indicated by the second position information is different from the first position and is outside of an in-stock region associated with the initial position or an in-stock position.

In a seventh aspect, alone or in combination with one or more of the above aspects, the at least one processor is further configured to cause the device to: determine whether the asset has moved from the second position within a time period from the second time, wherein the notification is transmitted responsive to determining that the asset has not moved from the second position within the time period.

In an eighth aspect, alone or in combination with one or more of the above aspects, the notification is an asset misplaced notification, wherein a first position indicated by the first position information corresponds to a first product region, and wherein a second position indicated by the second position information correspond to a second product region different from the first product region.

In a ninth aspect, alone or in combination with one or more of the above aspects, the notification is an asset misplaced notification, and wherein the at least one processor is further configured to cause the device to: determine whether the second position information indicates a position or region of a second product type different from a first product type of the asset; and determine the asset misplaced notification based on a determination that the asset is in a position or region of the second product type.

In a tenth aspect, alone or in combination with one or more of the above aspects, the notification is an asset misplaced notification, and wherein the at least one processor is further configured to cause the device to: determine whether the asset has moved from the second position within a time period from the second time, wherein the notification is transmitted responsive to determining that the asset has not moved from the second position within the time period.

In an eleventh aspect, alone or in combination with one or more of the above aspects, the notification is an asset misplaced notification, wherein a first position indicated by the first position information corresponds to an initial or in-stock region, wherein a second position indicated by the second position information is outside of the initial or in-stock region and is outside of a checkout region, and wherein the at least one processor is further configured to cause the device to: determine whether the asset has moved into the checkout region within a checkout time period from the second time, wherein the notification is determined based on a determination that the asset has not moved from the second position to the checkout region within the checkout time period.

In a twelfth aspect, alone or in combination with one or more of the above aspects, the notification is an asset stolen notification, wherein the asset stolen notification corresponds to a determination that the asset has moved and that the asset has not been checked out and is not detectable within a coverage area.

In a thirteenth aspect, alone or in combination with one or more of the above aspects, the notification is an asset stolen notification, and wherein the at least one processor is further configured to cause the device to: determine that the asset has moved to a second position from a first position based on the first position information and the second position information; determine whether the asset is detectable within in a coverage area after the second time responsive to a determination that the asset has moved; determine whether the asset has been checked out responsive to the determination that the asset has moved; and determine the asset stolen notification based on a determination that the asset is no longer detectable in the coverage area and on a determination that the asset has not been checked out.

In a fourteenth aspect, alone or in combination with one or more of the above aspects, the notification is an asset not responding notification which indicates the asset is no longer detectable and the asset has not been previously indicated as checked out or outside of a coverage area.

In a fifteenth aspect, alone or in combination with one or more of the above aspects, the at least one processor is further configured to cause the device to: determine that the asset has moved to a second position from a first position based on the first position information and the second position information; determine whether the asset has moved from the second position responsive to a determination that the asset has moved to the second position; determine whether the asset is detectable within a coverage area responsive to the determination that the asset has moved to the second position; and determine the asset not responding notification based on a determination that the asset has not moved from the second position and is no longer detectable in the coverage area.

In a sixteenth aspect, alone or in combination with one or more of the above aspects, the at least one processor is further configured to cause the device to: obtain third position information for the asset based on third wireless information, the third position information associated with a third time; determine a second notification for the asset based on the notification, the second position information, the third position information, the second time, and the third time; and transmit a second notification message based on the second notification.

In a seventeenth aspect, alone or in combination with one or more of the above aspects, the asset corresponds to a radio-frequency identification (RFID) tag for a product.

In an eighteenth aspect, alone or in combination with one or more of the above aspects, the device corresponds to an electronic shelf label (ESL) for a type of product and wherein the ESL is associated with a plurality of tags corresponding to a plurality of assets of the type of product.

In a nineteenth aspect, alone or in combination with one or more of the above aspects, the device is an ESL controller, and wherein the ESL controller is associated with a plurality of ESLs and each ESL is associated with a plurality of tags corresponding to a plurality of assets of a type of product.

In a twentieth aspect, alone or in combination with one or more of the above aspects, the device is an ESL access point (AP), and wherein the ESL AP is associated with a plurality of ESL controllers.

In a twenty-first aspect, alone or in combination with one or more of the above aspects, the device is an edge or cloud server, and wherein the edge or cloud server is associated with a plurality of ESL access points (APs).

In a twenty-second aspect, alone or in combination with one or more of the above aspects, the at least one processor is further configured to cause the device to: receive an information request from a UE regarding the asset; and transmit a notification message indicating the notification to the UE and configured to cause the UE to provide visual aids, haptic feedback, or audio cues for a user of the UE indicating a current position of the asset.

In a twenty-third aspect, alone or in combination with one or more of the above aspects, the at least one processor is further configured to cause the device to: obtain third position information for the UE based on third wireless information; or receive the third position information for the UE from the UE; and generate the notification message based on the second position information and the third position information, wherein the notification message indicates directions from a position of the UE to the current position of the asset.

In a twenty-fourth aspect, alone or in combination with one or more of the above aspects, the at least one processor is further configured to cause the device to: transmit a second notification message to the asset or an ESL associated with a current position of the asset to provide audio and/or visual outputs for the UE.

In a twenty-fifth aspect, alone or in combination with one or more of the above aspects, the visual output includes or corresponds to a first color notification by a plurality of ESLs indicating a path to the asset.

In a twenty-sixth aspect, alone or in combination with one or more of the above aspects, the UE is a cell phone and is associated with a customer; the UE is a cell phone, a POS device, or a barcode scanner and is associated with an employee; or the UE is associated with a robot.

In a twenty-seventh aspect, alone or in combination with one or more of the above aspects, the notification is configured to provide guidance to a robot for the asset.

In a twenty-eighth aspect, alone or in combination with one or more of the above aspects, the at least one processor is further configured to cause the device to: transmit a notification message indicating the notification to the robot and configured to provide a position of the asset.

In a twenty-ninth aspect, alone or in combination with one or more of the above aspects, the at least one processor is further configured to cause the device to: transmit a second notification message to the asset or an ESL associated with a current position of the asset to provide audio and/or visual outputs for the robot, wherein the notification includes a first color or audio indication or a second color or audio indication, wherein the first color or audio indication indicates a correct position and the second color or audio indication indicates an incorrect position.

Accordingly, wireless communication devices may perform enhanced ESL position determination and ESL position based notifications to enable automated monitoring of the ESL system and products thereof, and enable improved or additional functionality for users or ESL systems including improved automated task completion. Accordingly, the network performance and user experience may be increased due to ESL based position determination and ESL position based notifications.

Figure 16:
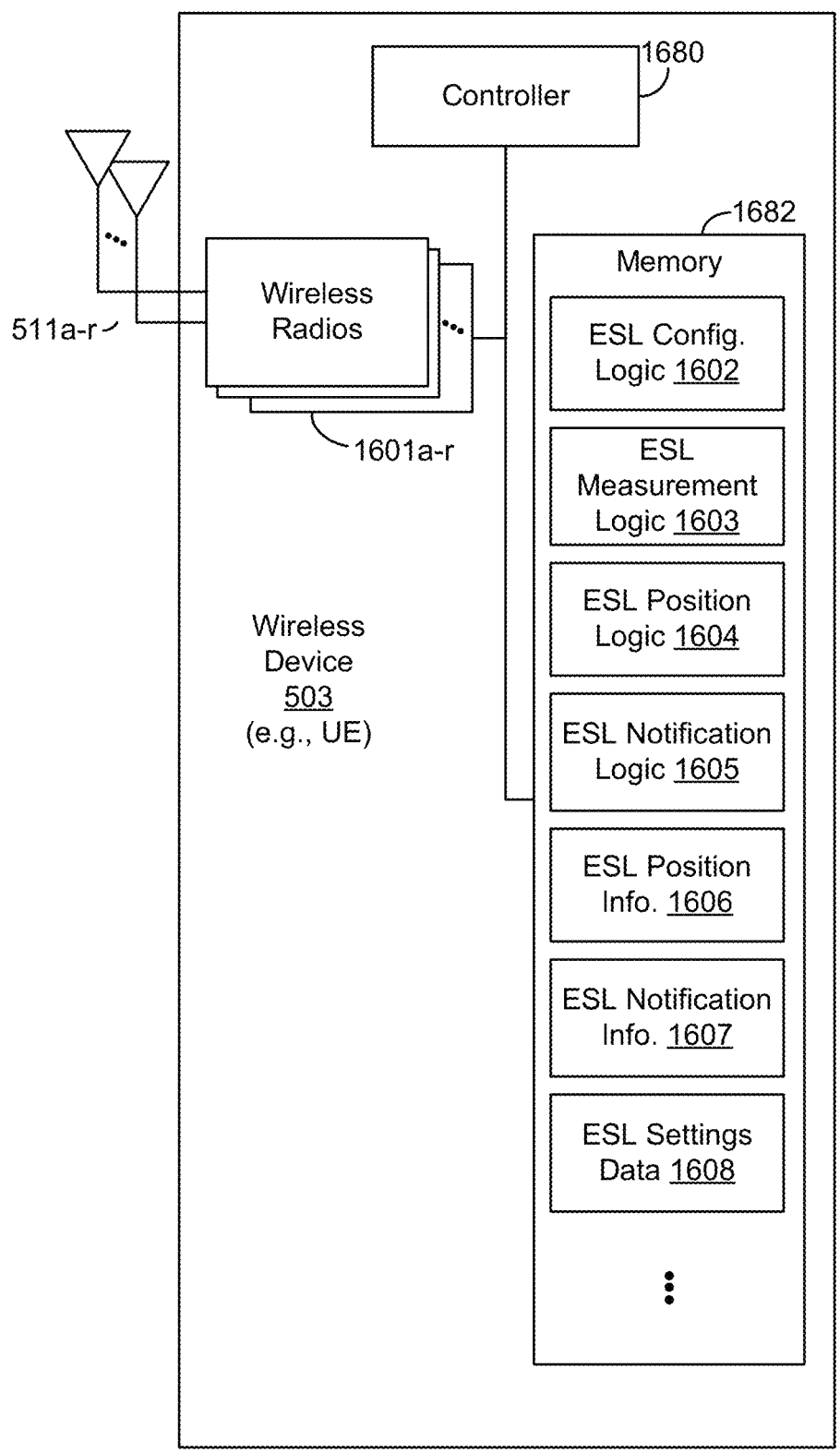
FIG. 16 is a block diagram of an example UE that supports enhanced ESL position determination and ESL position based notifications according to one or more aspects.

FIG. 13 is a flow diagram 1300 illustrating example blocks executed by a wireless communication device (e.g., a UE or an ESL device) configured according to an aspect of the present disclosure. The example blocks will also be described with respect to wireless device 503 as illustrated in FIG. 16. FIG. 16 is a block diagram illustrating wireless device 503 configured according to one aspect of the present disclosure. Wireless device 503 includes the structure, hardware, and components as illustrated for wireless device 503 of FIG. 5. For example, wireless device 503 includes controller/processor 1680, which operates to execute logic or computer instructions stored in memory 1682, as well as controlling the components of wireless device 503 that provide the features and functionality of wireless device 503. Wireless device 503, under control of controller/processor 1680, transmits and receives signals via wireless radios 1601a-r and antennas 511a-r. As illustrated in the example of FIG. 16, memory 1682 stores one or more of ESL configuration logic 1602, ESL measurement logic 1603, ESL position logic 1604, ESL notification logic 1605, ESL position information 1606, ESL notification information 1607, or ESL settings data 1608. The data (1002-1008)

stored in the memory 1682 may include or correspond to data and/or logic to enable the operations of FIGS. 4-6.

At block 1302, a wireless communication device, such as a UE, receives location information for one or more ESL devices indicating a location of each of the one or more ESL devices. The location information may include or correspond to one or more of the location information of the ESL devices of FIG. 6-10 or the initial/original position information. For example, the wireless device 503 receives the first position information 552 from the ESL device 501 of FIG. 5, or a UE receives the original position information of ESLs or the location information of ESLs, as described with reference to FIGS. 8 and 9.

At block 1304, the wireless communication device receives a signal from at least one of the one or more ESL devices. The signal may include or correspond to beacon signals or beacon response signals, as described with reference to FIGS. 5-10. For example, the UE 806 receives a beacon signal from the first ESL 802, as described with reference to FIG. 8.

At block 1306, the wireless communication device determines wireless information based on the received signals. The wireless information may include or correspond to signal information and/or measurement information for a beacon or beacon response of an ESL device. For example, the UE 806 determines measurement information for the received beacon signal from the first ESL 802, as described with reference to FIG. 8.

At block 1308, the wireless communication device determines position information indicating a position of the device based on the wireless information and based on the location information. The position information may include or correspond to a position of an ESL device or asset, such as an IoT tag (e.g., IoT tag 808). For example, the UE 806 may determine position information indicating a position of the ESL device based on the wireless information and based on the location information, as described with reference to FIG. 8.

The wireless communication device (e.g., UE or ESL device) may execute additional blocks (or the wireless communication device may be configured further to perform additional operations) in other implementations. For example, the wireless communication device may perform one or more operations described above, such as described with reference to FIGS. 5-10. As another example, the wireless communication device may perform one or more aspects as presented below.

FIG. 14 is a flow diagram 1400 illustrating example blocks executed by a wireless communication device (e.g., a UE or base station) configured according to an aspect of the present disclosure. The example blocks will also be described with respect to UE 115 as illustrated in FIG. 16.

At block 1402, a wireless communication device, such as a UE or a base station, transmits position information to an ESL server and determined based on ESL infrastructure. The position information may include or correspond to the first position 452 or any of the position information of FIGS. 6-10. For example, the UE 115 transmits the first position to an ESL server 602, 1002.

At block 1404, the wireless communication device transmits request information to the ESL server. The request information may include or correspond to request information of or indicated by the notification request 1009 of FIG. 10. For example, the UE 115 transmits the notification request 1009, including the request information (e.g., notification request information), to the ESL server 1002.

At block 1406, the wireless communication device receives visual or audio outputs from ESL devices associated with the ESL server. The visual or audio outputs may include or correspond to any of the visual or audio outputs of FIG. 10, 11A, or 11B. For example, the UE 115 may receive visual or audio outputs from ESLs associated with the ESL server 602, 1002.

At block 1408, the wireless communication device receives a notification or notification indication from the ESL server. The notification or notification indication may include or correspond to the notification 556 of FIG. 5, or any notification of FIG. 6, 7, 9, 10, 11A, or 11B. For example, the UE 115 may receive the notification indicating a notification indication, at 1030 or 1035 of FIG. 10.

At block 1410, the wireless communication device performs a task based on the visual or audio outputs, the notification or notification indication, or a combination thereof. The task may include or correspond to a task of a connected worker. For example, the ESL UE 906 may perform a restocking task as described in FIG. 11B after the notification at 1030, or any of the other example tasks described in FIG. 11B.

The wireless communication device (e.g., UE or base station) may execute additional blocks (or the wireless communication device may be configured further to perform additional operations) in other implementations. For example, the wireless communication device may perform one or more operations described above, such as described with reference to FIGS. 5-10. As another example, the wireless communication device may perform one or more aspects as presented below.

FIG. 15 is a flow diagram 1500 illustrating example blocks executed by wireless communication device (e.g., a UE or network entity, such as a base station) configured according to an aspect of the present disclosure. The example blocks will also be described with respect to base station 105 as illustrated in FIG. 17.

At block 1502, a wireless communication device, such as a UE or a network device (e.g., a base station 105), receives position information at an ESL server from a UE and determined based on ESL infrastructure. The position information may include or correspond to one or more of the position information 506 of FIG. 5. For example, the ESL device 501 receives first position information 552 or second position information 554 from a UE, such as UE 115 or non-ESL UE 1008.

At block 1504, the wireless communication device receives receive request information at the ESL server from the UE. The request information may include or correspond to request information of the notification request at 1009 of FIG. 10. For example, the ESL device 501 or the ESL server 1002 may receive a request from a UE, such as the ESL UE 1006 or the non-ESL UE 1008, indicating a request for a particular type of notification, such as where is a particular asset/product or where is a region or location for an asset/product.

At block 1506, the wireless communication device transmits notification instructions to one or more ESLs and configured to cause the one or more ESLs to output visual and/or audio indications. The notification instructions may include or correspond to the transmission 456 of FIG. 4 or the downlink transmission at 545 of FIG. 5. The output visual and/or audio indications may include or correspond to the output visual and/or audio indications as described with reference to FIGS. 10, 11A, and 11B. For example, the ESL device 501 or ESL server 1002 may transmit the notification instructions to one or more ESLs (1004) which configure the ESLs to output audio and/or video indications to a UE or a user associated with a UE.

At block 1508, the wireless communication device optionally transmits a notification or notification indication to the UE. The notification or notification indication may include or correspond to the notification 556 of FIG. 5 or any of the notifications of FIG. 6-10. For example, the ESL device 501 or ESL server 1002 may transmit a notification which configure the ESL UE 1006 or the non-ESL UE 1008 to output audio and/or video indications to a UE or a user associated with a UE.

The wireless communication device (e.g., such as a UE or base station) may execute additional blocks (or the wireless communication device may be configured further to perform additional operations) in other implementations. For example, the wireless communication device may perform one or more operations as described with reference to FIGS. 5-11C. As another example, the wireless communication device may perform one or more aspects as described above with reference to FIG. 12-14 or one or more aspects as presented below.

Accordingly, wireless communication devices may perform enhanced ESL position determination and ESL position based notifications to enable automated monitoring of the ESL system and products thereof, and enable improved or additional functionality for users or ESL systems including improved automated task completion. Accordingly, the network performance and user experience may be increased due to ESL based position determination and ESL position based notifications.

In the implementations described herein, an ESL system or network may include an ESL cloud server, one or more ESL gateway servers or edge servers associated with the ESL cloud server, one or more ESL APs associated with each gateway or edge server, one or more ESL controllers associated with each ESL AP, one or more ESLs associated with each ESL controller, and one or more ESL tags associated with each ESL. In some implementations, the ESL system may include a plurality of energizers, which may be associated with multiple ESL tags of the plurality of the ESL tags.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-17 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A device for wireless communication, comprising:
at least one processor; and
a memory coupled to the at least one processor,
wherein the at least one processor is configured to cause the device to:
obtain first position information for an asset of one or more assets associated with an electronic shelf label system based on first wireless information, the first position information associated with a first time, wherein the asset is a physical asset;
obtain second position information for the asset based on second wireless information, the second position information associated with a second time; and
output a notification for the asset based on the first position information, the second position information, the first time, and the second time.

2. The device of claim 1, wherein the at least one processor configured to cause the device to obtain the first position information includes to:
receive the first position information from an ESL device;
perform uplink position determination based on uplink wireless information from one or more ESL devices to determine the first position information; or
perform downlink position determination based on downlink wireless information from one or more ESL devices to determine the first position information.

3. The device of claim 1, wherein the at least one processor configured to cause the device to obtain the second position information includes to:
perform an uplink position determination to determine the second position information; or
perform a downlink position determination to determine the second position information.

4. The device of claim 3, wherein the at least one processor configured to cause the device to perform the downlink position determination include to:
transmit a beacon;
receive a response to the beacon from the asset;
calculate one or more of a received signal strength indicator (RSSI), a reference signal received power (RSRP), or an angle-of-arrival (AoA), of the response; and
determine the second position information based on one or more of the RSSI, the RSRP, or the AoA of the response to the beacon.

5. The device of claim 3, wherein the at least one processor configured to cause the device to perform the uplink position determination include to:
receive a beacon from the asset;
calculate one or more of a received signal strength indicator (RSSI), a reference signal received power (RSRP), or an angle-of-arrival (AoA), of the beacon; and
determine the second position information based on one or more of the RSSI, the RSRP, or the AoA of the beacon.

6. The device of claim 1, wherein the notification comprises an asset moved notification, an asset misplaced notification, an asset stolen notification, or an asset not responding notification, and wherein the at least one processor is configured to cause the device to:
transmit a notification message indicating the notification.

7. The device of claim 6, wherein the notification is an asset moved notification, wherein a first position indicated by the first position information corresponds to an initial position or an in-stock position, and wherein a second position indicated by the second position information is different from the first position and is outside of an in-stock region associated with the initial position or an in-stock position.

8. The device of claim 7, wherein the at least one processor is configured to cause the device to:
determine whether the asset has moved from the second position within a time period from the second time, wherein the notification is transmitted responsive to determining that the asset has not moved from the second position within the time period.

9. The device of claim 6, wherein the notification is an asset misplaced notification, wherein a first position indicated by the first position information corresponds to a first product region, and wherein a second position indicated by the second position information correspond to a second product region different from the first product region.

10. The device of claim 6, wherein the notification is an asset misplaced notification, and wherein the at least one processor is configured to cause the device to:
determine whether the second position information indicates a position or region of a second product type different from a first product type of the asset; and
determine the asset misplaced notification based on a determination that the asset is in a position or region of the second product type.

11. The device of claim 10, wherein the notification is an asset misplaced notification, and wherein the at least one processor is configured to cause the device to:
determine whether the asset has moved from a second position associated with the second position information within a time period from the second time, wherein the notification is transmitted responsive to determining that the asset has not moved from the second position within the time period.

12. The device of claim 6, wherein the notification is an asset misplaced notification, wherein a first position indicated by the first position information corresponds to an initial or in-stock region, wherein a second position indicated by the second position information is outside of the initial or in-stock region and is outside of a checkout region, and wherein the at least one processor is configured to cause the device to:
determine whether the asset has moved into the checkout region within a checkout time period from the second time, wherein the notification is determined based on a determination that the asset has not moved from the second position to the checkout region within the checkout time period.

13. The device of claim 6, wherein the notification is an asset stolen notification, wherein the asset stolen notification corresponds to a determination that the asset has moved and that the asset has not been checked out and is not detectable within a coverage area.

14. The device of claim 6, wherein the notification is an asset stolen notification, and wherein the at least one processor is configured to cause the device to:
determine that the asset has moved to a second position from a first position based on the first position information and the second position information;
determine whether the asset is detectable within in a coverage area after the second time responsive to a determination that the asset has moved;
determine whether the asset has been checked out responsive to the determination that the asset has moved; and
determine the asset stolen notification based on a determination that the asset is no longer detectable in the coverage area and on a determination that the asset has not been checked out.

15. The device of claim 6, wherein the notification is an asset not responding notification which indicates the asset is no longer detectable and the asset has not been previously indicated as checked out or outside of a coverage area.

16. The device of claim 6, wherein the at least one processor is configured to cause the device to:
determine that the asset has moved to a second position from a first position based on the first position information and the second position information;
determine whether the asset has moved from the second position responsive to a determination that the asset has moved to the second position;
determine whether the asset is detectable within a coverage area responsive to the determination that the asset has moved to the second position; and
determine the asset not responding notification based on a determination that the asset has not moved from the second position and is no longer detectable in the coverage area.

17. The device of claim 6, wherein the at least one processor is configured to cause the device to:
obtain third position information for the asset based on third wireless information, the third position information associated with a third time;

determine a second notification for the asset based on the notification, the second position information, the third position information, the second time, and the third time; and transmit a second notification message based on the second notification.

18. The device of claim 1, wherein the asset corresponds to a radio-frequency identification (RFID) tag for a product.

19. The device of claim 1, wherein the device corresponds to an electronic shelf label (ESL) for a type of product and wherein the ESL is associated with a plurality of tags corresponding to a plurality of assets of the type of product.

20. The device of claim 1, wherein the device is an ESL controller, and wherein the ESL controller is associated with a plurality of ESLs and each ESL is associated with a plurality of tags corresponding to a plurality of assets of a type of product.

21. The device of claim 1, wherein the device is an ESL access point (AP), and wherein the ESL AP is associated with a plurality of ESL controllers.

22. The device of claim 1, wherein the device is an edge or cloud server, and wherein the edge or cloud server is associated with a plurality of ESL access points (APs).

23. The device of claim 1, wherein the at least one processor is configured to cause the device to:
receive an information request from a UE regarding the asset; and
transmit a notification message indicating the notification to the UE and configured to cause the UE to provide visual aids, haptic feedback, or audio cues for a user of the UE indicating a current position of the asset.

24. The device of claim 23, wherein the at least one processor is configured to cause the device to:
obtain third position information for the UE based on third wireless information; or
receive the third position information for the UE from the UE; and
generate the notification message based on the second position information and the third position information, wherein the notification message indicates directions from a position of the UE to the current position of the asset.

25. The device of claim 23, wherein the at least one processor is configured to cause the device to:
transmit a second notification message to the asset or an ESL associated with a current position of the asset to provide an audio, a visual output, or both, for the UE.

26. The device of claim 25, wherein the visual output includes or corresponds to a first color notification by a plurality of ESLs indicating a path to the asset.

27. The device of claim 23, wherein:
the UE is a cell phone and is associated with a customer;
the UE is a cell phone, a POS device, or a barcode scanner and is associated with an employee; or
the UE is associated with a robot.

28. The device of claim 1, wherein the notification is configured to provide guidance to a robot for the asset.

29. The device of claim 28, wherein the at least one processor is configured to cause the device to:
transmit a notification message indicating the notification to the robot and configured to provide a position of the asset.

30. The device of claim 28, wherein the at least one processor is configured to cause the device to:
transmit a second notification message to the asset or an ESL associated with a current position of the asset to provide audio and/or visual outputs for the robot, wherein the notification includes a first color or audio indication or a second color or audio indication, wherein the first color or audio indication indicates a correct position and the second color or audio indication indicates an incorrect position.

* * * * *